(12) United States Patent
Govindan et al.

(10) Patent No.: US 8,195,175 B2
(45) Date of Patent: Jun. 5, 2012

(54) METHOD FOR VERIFICATIONS AND FAST QOS ESTABLISHMENT

(75) Inventors: Saravanan Govindan, Singapore (SG); Hong Cheng, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 686 days.

(21) Appl. No.: 12/159,370

(22) PCT Filed: Dec. 28, 2005

(86) PCT No.: PCT/JP2005/024282
§ 371 (c)(1),
(2), (4) Date: Jun. 26, 2008

(87) PCT Pub. No.: WO2007/077618
PCT Pub. Date: Jul. 12, 2007

(65) Prior Publication Data
US 2010/0220665 A1 Sep. 2, 2010

(51) Int. Cl.
*H04W 72/00* (2009.01)

(52) U.S. Cl. ........ 455/450; 455/436; 455/442; 455/410; 455/411; 455/414.1

(58) Field of Classification Search ............ 455/450, 455/436, 442, 410, 411, 414.1
See application file for complete search history.

(56) References Cited

U.S. PATENT DOCUMENTS

| 6,370,380 | B1 | 4/2002 | Norefors et al. |
| 6,693,912 | B1 | 2/2004 | Wang |
| 2004/0001511 | A1 | 1/2004 | Matta |
| 2004/0090937 | A1 | 5/2004 | Chaskar |
| 2004/0095912 | A1 | 5/2004 | Gao et al. |
| 2004/0196808 | A1 | 10/2004 | Chaskar et al. |
| 2004/0260805 | A1 | 12/2004 | Aoyama et al. |
| 2005/0265304 | A1* | 12/2005 | Kim et al. ............ 370/349 |

FOREIGN PATENT DOCUMENTS

| JP | 2002-537739 | 11/2002 |
| JP | 2004-056515 | 2/2004 |
| JP | 2004-533790 | 11/2004 |
| WO | 2004/034592 | 4/2004 |
| WO | 2005/015938 | 2/2005 |

OTHER PUBLICATIONS

Japanese Office Action dated Mar. 8, 2011.
Patent Abstracts of Japan, vol. 2003, No. 12, Dec. 5, 2003 & JP 2004 297157 A (Samsung Electronics Co Ltd), Oct. 21, 2004 abstract.

* cited by examiner

*Primary Examiner* — Nghi Ly
(74) *Attorney, Agent, or Firm* — Dickinson Wright PLLC

(57) ABSTRACT

A wireless communication system is provided for rapidly establishing the QoS resource on different communication networks. In this system, the NAP evaluates a network resource used by the MT, and generates the QoS history information unit indicating the evaluation result. The AAA authenticates the QoS history information unit generated by the NAP. The NAP transmits the authenticated QoS history information unit to the MT. The MT request for a resource establishment to the NAP when switching the communicating party from the NAP to the NAP, and transmits the QoS history information unit. The NAP verifies the authenticity of the QoS history information unit to the AAA when receiving the request for resource establishment from the MT and allocates the network resource to the MT based on the QoS history information unit.

10 Claims, 17 Drawing Sheets

METHOD FOR VERIFICATIONS AND FAST QOS ESTABLISHMENT

TECHNICAL FIELD

The present invention pertains to resource management in communications networks and, more particularly, it relates to the verification and establishment of quality of service resources in mobile environments.

BACKGROUND ART

[Prior-Art 1] U.S. Pat. No. 6,693,912B1, "Network Interconnectivity Apparatus and Active Quality of Service Mapping Method," February 2004.
[Prior-Art 2] US 2004/000 1511 A1, "Catprobe," June 2002.
[Prior-Art 3] US 2004/009 5912 A1, "Handover Resource Optimization," November 2002.

The increasing popularity of mobile wireless communications has resulted in the development of numerous communications technologies. Each technology addresses user needs in different environments, under different circumstances or during different time periods. Consequently, the entirety of user needs is addressed by a combination of different technologies. So users will utilize heterogeneous communications networks to satisfy their needs.

Among the numerous technologies, is the IEEE 802.11 wireless local area network (WLAN). This communications technology is used in localized areas of high communications activity or hotspots. They are generally available at locations such as residences, offices and shops. IEEE 802.11 WLANs are characterized by gross achievable data rates of 11 Mbps or 54 Mbps. This is the data rate available at the physical layer. The typical sustained throughput as calculated at the IP layer is approximately 4 Mbps to 5 Mbps and 10 Mbps to 20 Mbps, respectively, due to header, signaling and timing overheads. Due to its contention-based CSMA/CA radio access technique, IEEE 802.11 WLANs are also characterized by high packet loss-rates and long radio access delays. The performance of IEEE 802.11 WLANs is also affected by their locations. For example, IEEE 802.11 WLANs located in an office environment are utilized by more users than those in a residential environment. As a result, the load levels and consequently, delays are higher for office IEEE 802.11 WLANs.

Another technology that addresses user needs is the cellular GPRS network. This communications technology has been used to cover large areas of many square kilometers. Cellular GPRS networks are characterized by gross achievable data rates of 171 Kbps. Due to its contention-free TDMA radio allocation technique, cellular GRPS networks are characterized lower packet loss-rates and shorter radio access delays as compared to IEEE 802.11 WLANs.

Another communications technology that is currently being increasingly deployed is cellular third-generation (3G) networks. This technology is used to cover large areas similar to those of cellular GRPS networks. Cellular 3G networks are characterized by gross achievable data rates of 384 Kbps with further developments in process of delivering even greater data rates. Due to its radio allocation technique in which unique codes are used for radio access, contention is avoided. This leads to lower packet loss-rates compared to IEEE 802.11 WLANs. Given its nascent state, cellular 3G networks are not as widely available as cellular GPRS networks.

In general, communications network technologies are characterized by differences in achievable data rates or throughput, packet loss-rate, retransmission delay, retransmission attempts, radio access delay and network load conditions. The resulting heterogeneity requires innovative methods for effective operation.

Mobile wireless user terminals typically use a combination of different communications technologies to meet their needs. For example, a mobile wireless user terminal will use a multi-mode terminal device to access an IEEE 802.11 WLAN while at home, then switch to a cellular GPRS network when driving from home to the city, then switch again to a cellular 3G network when entering the coverage area in the city downtown area and finally switch back to an IEEE 802.11 WLAN when reaching the office.

[Problem 1: Sudden Switching Disrupts Performance]

So as mobile wireless user terminals switch between technologies of different communications networks, their varying characteristics and conditions alter the quality of service (QoS) performance for the users and their applications. For example, when switching from an office IEEE 802.11 WLAN to a cellular 3G network, users encounter lower throughput and simultaneously, reduced packet loss-rates and shorter radio access delays. So, if the user was using a streaming video application, there will be an abrupt disruption or degradation of video quality after the network switch. Application performance must be preferably seamless when switching from one type of network technology to another. Alternatively, application performance must be gradually adapted to prevailing network conditions and characteristics.

The transition period between one communications network to another is a critical part of communications. It is during this period that mobile wireless user terminals and their applications are most vulnerable to disruption. This is seen by the fact that in traditional, non-heterogeneous communications networks, service providers assign greater priorities to transitioning sessions as compared to newly originating sessions.

[Problem 2: QoS Mapping Adds Overhead and Time]

Furthermore, due to the changes in link characteristics resulting from switching between communications networks, mobile terminal devices must map their existing QoS requirements to the new link characteristics and conditions. This is an intensive and time-consuming task for mobile terminal devices, which have limited battery power. When a user switches frequently, mapping of QoS requirements becomes a processing overhead that adversely affects QoS performance. Additionally, signaling required for negotiating QoS resources at new communications networks is also time-consuming because greater exchanges are required to confirm and establish appropriate QoS requirements, which are not known to the mobile terminal device.

[Problem 3: Inefficient Resource Utilization]

Another problem arising from switching between technologies of different communications networks is that QoS resources are not efficiently allocated due to differences in mobility conditions. For example, when two users switch to an IEEE 802.11 WLAN—a first user from a cellular 3G network and a second user from another IEEE 802.11 WLAN—both will make identical QoS resource requests to the new IEEE 802.11 WLAN. However the first user from the cellular 3G network will have substantially lower actual throughput requirements due to the user's past history with the lower-throughput cellular 3G network. So allocating identical QoS resources to both requests is inefficient as the first user from the cellular 3G will not completely utilize them. This problem is exacerbated when there are large numbers of users moving to an IEEE 802.11 WLAN from different types of previous communications networks.

[Problem 4: Unauthenticated QoS Requests]

Related to the problem of inefficient resource allocation, is the problem of inaccurate QoS resource requests. Based on extant technologies and prior arts, it is not possible for a communications network to verify the exact nature of a user's QoS resource request. As a result, a communications network must allocate the entirety of request QoS resources even if the user utilized substantially lower resources at a previous communications network. For example, when a user switches from a first to a second communications network, it is not possible to verify which type of network the user switched from, the level of resource utilization at the first network and the time duration spent at the first network. As a result, the second communications network cannot allocate the optimal level of QoS resources. So inaccurate resource requests, whether legitimate or illegitimate, cannot be verified by technologies of existing communications networks.

Such problems of abrupt performance changes, switching overhead, inefficient QoS resource allocations and unauthenticated QoS requests deprives mobile wireless user terminals of seamless communications. Consequently, mobile wireless user terminals suffer from poor QoS performance.

[Prior-Art 1] illustrates a method for adjusting QoS performance when a mobile wireless user terminal switches from one communications network to another. The method relies on an active packet—indicating QoS characteristics of the first communications network—being sent to the second communications network. The method, despite its theoretical basis, has limited practical appeal because it requires the two different networks to be in communications with each other. In reality, communications networks of different technologies are not communicably coupled. This is because of security concerns, competitive advantage and incompatibility. So the proposed method is not effective in solving the needs of mobile wireless user terminals.

[Prior-Art 2] presents a method for a first communications network to determine the QoS conditions at a second communications network by means of ICMP time-stamp messages. This method is disadvantaged similarly to [Prior-Art 1] in that it requires the two networks to be communicably coupled in order to be effective. So in practice, this method is not a feasible solution to address the problems faced by mobile wireless user terminals that switch between different communications networks.

[Prior-Art 3] illustrates yet another method to address the needs of mobile wireless user terminals switching between communications networks. This method utilizes foreign agents at each communications network and requires them to collaborate to provide consistent QoS across handovers. This is not feasible for the practical cases in which mobile wireless user terminals switch between distinct communications networks that do not offer a medium for coordination. The foreign agents of this method are not effective in addressing the problems highlighted earlier.

The prior arts discussed insofar illustrate the lack of existing mechanisms to address the needs of mobile wireless user terminals that switch between distinct communications networks. In particular, these users are faced with the problems of abrupt performance changes, switching overhead, inefficient QoS resource allocations and unauthenticated QoS requests, which consequently deprive them of seamless communications.

DISCLOSURE OF INVENTION

In view of the above discussed problems, it is the objective of the present invention to provide systems and methods for fast establishment of QoS resources across heterogeneous communications networks.

It is another objective of the invention to provide methods for monitoring and updating QoS utilization histories of mobile wireless user terminals.

It is another objective of the invention to provide methods for verifying QoS requests from mobile wireless user terminals switching across heterogeneous communications networks.

It is yet another objective of the invention to provide methods for allocating QoS resources based on actual needs of mobile wireless user terminals.

It is yet another objective of the invention to provide methods for gradually adjusting initial allocations of QoS resources after a determined period of mobile wireless user terminals receiving communications services.

The present invention addresses the problems relating to QoS and network resource allocations across communications networks. In particular, the invention addresses the problem of abrupt changes in network conditions and characteristics as mobile wireless user terminals move across communications networks. The invention also addresses the problems of signaling and processing overhead and inefficient resource allocations for mobile wireless user terminals. Another problem the invention addresses is the verification of resource requests by mobile wireless user terminals.

In its broadest aspect, the present invention provides a system for generating resource utilization updates of a communications network comprising, means for evaluating resource utilization; and means for assigning verifications to resource utilization evaluations; whereby, said resource utilization updates summarize communications network services received by a mobile wireless user terminal of said communications network.

In another aspect, the current invention presents a system for verifying resource utilization updates comprising means for assigning verifications to said resource utilization updates based on security association of mobile wireless user terminals with a single or plurality of external entities.

In a preferred form of the invention for verifying resource utilization updates, said external entities are authentication, authorization and authentication (AAA) entities.

Another aspect of the present invention presents a system for fast establishment of network communications by a mobile wireless user terminal comprising; means for receiving resource utilization updates of a first communications network; and means for providing said resource utilization updates from a first communications network to a second communications network; whereby, signaling for negotiating resources at said second communications network is partially or wholly substituted by means of said resource utilization updates.

In a preferred form of the invention for a system of fast establishment of network communications, said first and second communications networks are distinct said distinctions comprising technologies, characteristics and conditions.

In another preferred form of the invention for a system of fast establishment of network communications, said resource utilization updates are provided by said mobile wireless user terminal moving from said first communications network to said second communications network.

In yet another aspect of the invention, a system for efficient allocation of network resources is presented wherein comprising means for verifying resource utilization updates of a mobile wireless user terminal; and means for allocating network resources consistent with the actual resource utilizations of said mobile wireless user terminal at a first communications network; whereby, said actual resource utilizations are determined from said resource utilization updates of said mobile wireless user terminal.

Another aspect of the invention presents a system for efficient allocation of network resources in a communications network comprising means for adjusting initial resource allocations to a mobile wireless user terminal after a determined time period of providing communications services to said mobile wireless user terminal by said communications network.

In a preferred form of the invention for efficient allocation of network resources, said adjustments are made gradually to allow communications applications of said mobile wireless user terminal to gradually adapt to prevailing conditions and characteristics of said communications network.

BEST MODE FOR CARRYING OUT THE INVENTION

In the following description, for the purpose of explanation, specific numbers, times, structures and other parameters are set forth in order to provide a thorough understanding of the present invention. However, it will be apparent to those skilled in the art that the present invention may be practiced without these specific details.

Embodiment 1

Distributing verified QoS History

Figure 1:
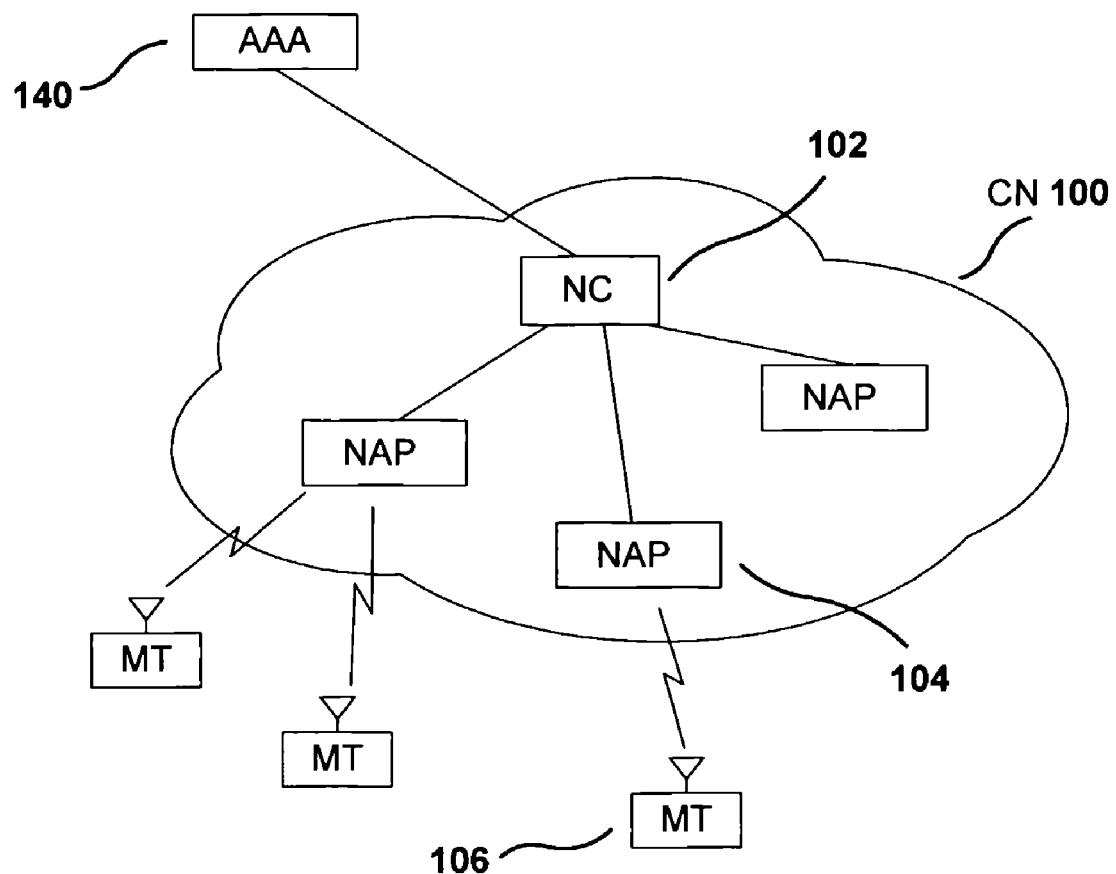
FIG. 1 illustrates a communications network and mobile wireless terminals within which the present invention operates.

With reference to FIG. 1, a communications network (CN) (100) provides services to a single or plurality of mobile terminals (MT), such as MT (106). CN (100) comprises network controller (NC) (102) and a single or plurality of network attachment points (NAP) such as NAP (104). CN (100) may be interfaced to a single or plurality of other communications network such as Internet.

NC (102) is representative of a controller entity capable of coordinating network resources, provisioning NAPs, such as NAP (104), and controlling MTs, such as MT (106). NAP (104) is representative of a contact entity capable of establishing and maintaining radio interfaces with MTs, such as MT (106), monitoring radio activity and relaying communications traffic between MTs and CNs. NC (102) and NAP (104) are communicably coupled by means of wireline or wireless links.

NC (102) and NAP (104) assume different roles for different communications networks. For IEEE 802.11 WLANs, NC (102) represents a WLAN controller or WLAN switch and NAP (104) represents a wireless access point (WAP). For such cases, NC (102) and NAP (104) may communicate using the IETF CAPWAP protocol. For cellular GPRS and cellular 3G communications networks, NC (102) represents a mobile switching center (MSC) or base station controller (BSC) and NAP (104) represent a base transceiver station (BTS).

CN (100) has access to an authentication, authorization, accounting (AAA) server (140). CN (100) uses protocols, such as RADIUS, for communications with AAA (140).

In accordance with the present invention, NAP (104) regularly monitors radio link performance metrics for each of a single or plurality of MTs that are in contact, such as MT (106). The radio link performance metrics comprise throughput achieved, packet or bit loss rates, radio propagation delays and delay jitter. These metrics are then regularly sent to NC (102).

NC (102) regularly monitors communications performance metrics for each of a single or plurality of MTs of CN (100). The communications performance metrics comprise retransmission attempts, communications session establishment times, memory utilization, scheduling priorities, volume to traffic transmissions, transmission durations and network load levels. Another communications performance metric is a user satisfaction index, which determines the degree to which CN (100) satisfies a user's needs. The user satisfaction index is based on feedback from users.

NC (102) combines radio link performance metrics with communications performance metrics to derive a QoS history information unit. The QoS history information unit summarizes the communications experience of MT (106) at CN (100). The QoS history information unit is assigned a verification code that is derived from the security association of MT (106) with AAA (140). The verification code serves to authenticate the veracity of the QoS history information unit and prevents subsequent changes to it by either MT (106) or any other entity. The QoS history information unit is assigned a time-stamp to specify its time relevance.

The verification code is derived by a performing a reversible and strongly collision-free hash function over the entirety of the QoS history information unit. This results in a verification code of fixed length for any given length of the input information unit. In one embodiment, the hash function is a mix function using a sequence of addition, subtraction, exclusive-or and bit-shift. The authentication secret used in the security association of MT (106) with AAA (140) is used as either for the exclusive-or or bit-shift operations of the hash function. The hash function may further comprise an addition, subtraction, exclusive-or or bit-shift operation based the time stamp of QoS history information unit derivation. As a result, the verification code is unique for each instance a QoS history information unit is derived for a MT (106).

In one embodiment, the time-stamp is based on a synchronized timer between all network controllers, such as NC (102), and a common timer, such as that in the AAA (140). Such synchronization across heterogeneous communications networks allows each network controller to maintain the same time. In an alternative embodiment, the time-stamp is assigned by the AAA (140) as part of the verification code.

The QoS history information unit presents a snapshot of the communications services received by MT (106) from CN (100). This information is made immediately available to subsequent communications networks to which MT (106) moves such that signaling and processing overhead are reduced and seamless communications services are provided.

As a result of the QoS history information unit authenticated with the verification code and time-stamp, a second communications network can verify the actual QoS resource needs of a MT moving from a first communications network and accordingly provision resources so as to efficiently allocate resources and deliver seamless communications services.

Embodiment 2

Sequence QoS History Info Unit

Figure 2:
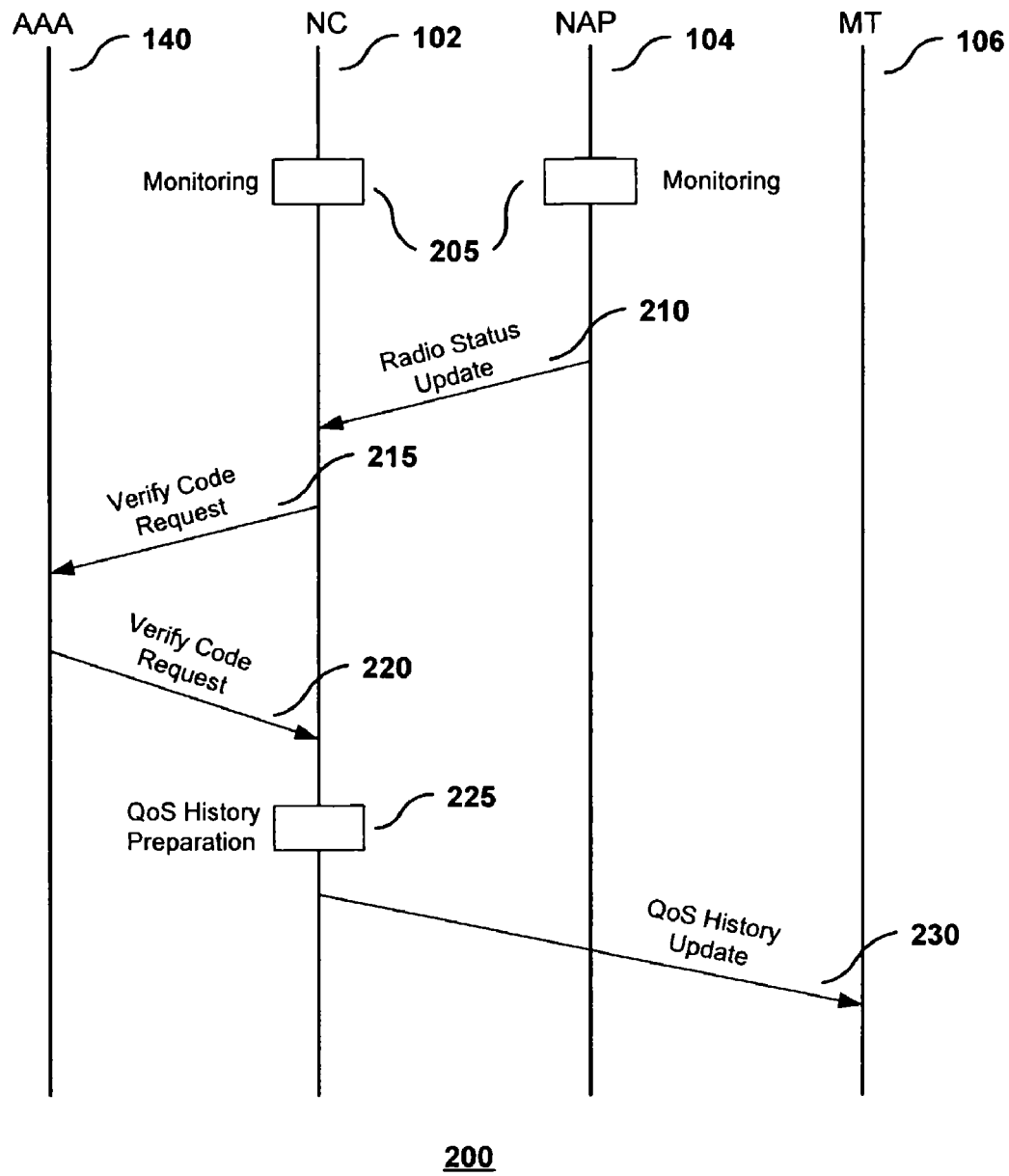
FIG. 2 depicts a sequence of operations of providing regular updates of QoS history according to the present invention.
Figure 14:
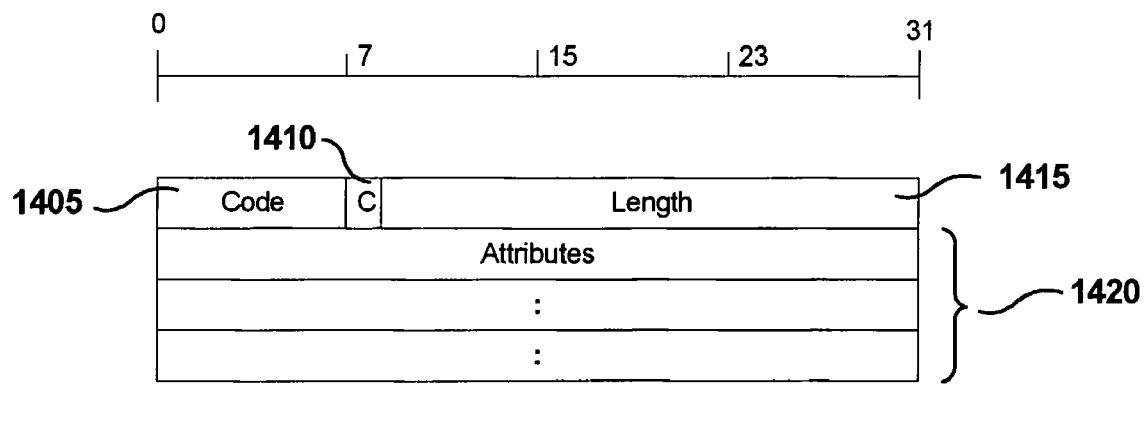
FIG. 14 depicts a message structure in accordance with the present invention for message exchanges between network attachment point and network controller.

The sequence of operations among NC (102), NAP (104), AAA (140) and MT (106) is described hereinafter with aid of FIG. 2. Additionally, FIG. 14 is used to illustrate the structure (1400) of messages exchanged in the current invention. Each message begins with a 1-byte Type field (1405) with a value corresponding to the nature of the message. Subsequent descriptions of messages include their Type (1405) values. The C field (1410) is denotes if the message is destined for a network controller or originated from a network controller. A '0' value denotes a message from a NC and a '1' value denotes a message to a NC. The subsequent Length field (1415) denotes the total length of the message in bytes. Subsequent Message Element fields (1420) comprise various parameters and settings for the message type.

In the operational sequence (200), NAP (104) and NC (102) regularly monitor radio link performance metrics and communications performance metrics, respectively in a monitoring step (205). The monitoring step (205) may be performed periodically, in mutual coordination or be triggered by other events. This step enables NAP (104) and NC (102) to gather information on the state of the communications network, CN (100), and the state of mobile terminal MT (106).

Upon gathering adequate information on the radio link performance metrics, NAP (104) sends a Radio Status Update message to NC (102) in a step (210). This message has a Type field (1405) value of '1'. The Radio Status Update message contains evaluated or computed values of the radio link performance metrics. The metrics are organized as information message elements (1420) according to a pre-determined format within the Radio Status Update message. The message elements for the Radio Status Update message comprise Average Loss Rate, Average Transmission Rate, Average Delay etc.

In a step (215), NC (102) sends a Verification Code Request message to the AAA server, AAA (140). This message has a Type field (1405) value of '2'. The Verification Code Request contains information derived from security state maintained by NC (102). This security information is included in the message element field (1420). AAA (140) provides the verification code to NC (102) in a Verification Code Response message, with Type field (1405) value of '3', in a step (220). The verification code is derived from security state corresponding to MT (106), which is maintained by AAA (140) and NC (102). Additionally, the AAA (140) includes its time-stamp in the Verification Code Response message (220). Alternatively, the verification code may be derived by NC (102) alone, this code still based on the security association with AAA (140). The message elements (1420) of the Verification Code Response message comprise the verification code and time-stamp.

In a step (225), NC (102) prepares a QoS history information unit for MT (102). In this step, NC (102) combines information from the Radio Status Update message of step (210) with its own communications performance metrics. The combination includes a list of information elements corresponding to the values of the evaluated or computed metrics. The QoS history information unit also comprises a time-stamp to specify the time relevance of the information contained within. The time-stamp may be assigned by the NC (102) using a timer synchronized with AAA (140) or the time-stamp may be assigned by the AAA (140) during its derivation of the verification code. Then using the verification code, the QoS history information unit is authenticated from NC (102). This serves to inform subsequent communications network that the QoS history information unit accurately describes the status and resource utilization history of MT (106) at CN (100).

After preparing the QoS history information unit, NC (102) sends a QoS History Update message to MT (106) in a step (230). The QoS History Update message has a Type field (1405) value of '4' and comprises the time-stamped and verified QoS history information unit as its message elements (1420). Upon receiving the QoS History Update message, MT (106) removes any previously stored QoS history information units and stores the new information unit.

Embodiment 3

Fast Re-Establishment

In one embodiment, the QoS history information unit is used to reduce signaling and processing operations during transitions between heterogeneous communications networks and enhance seamless communications. As described above, the transition period between communications networks is critical and must ensure that mobile wireless user terminals receive communications services that are as seamless as possible. It is for this reason that in the present embodiment, the initial signaling required between a mobile terminal and new communications network are bypassed by means of sending the QoS history information unit. The new communications network verifies the information unit and establishes the necessary resources and state information without requiring time-consuming signaling operations.

Figure 3:
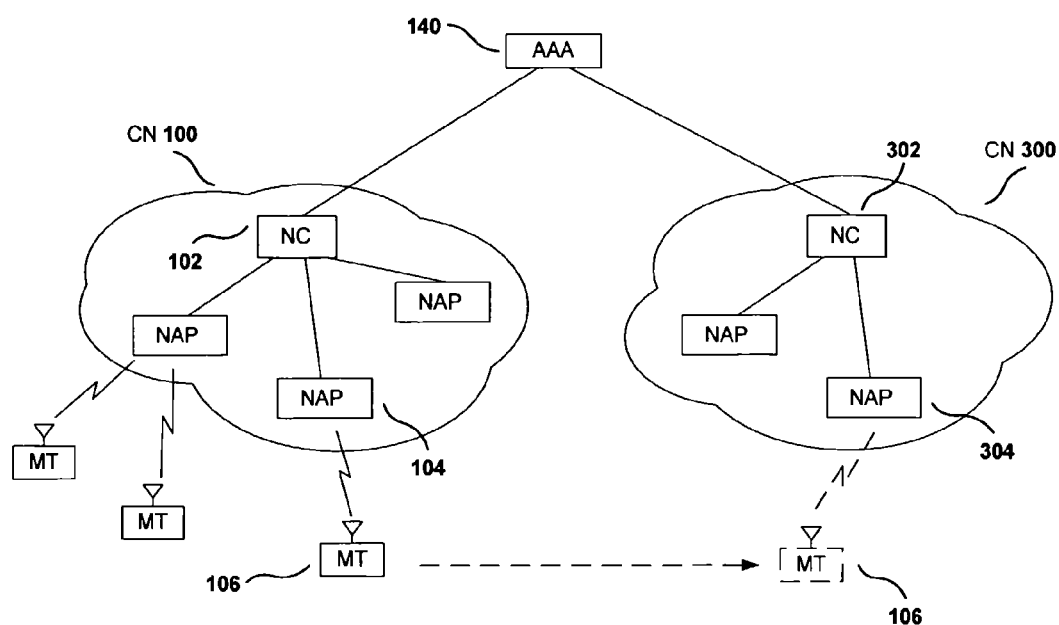
FIG. 3 illustrates heterogeneous communications networks and mobile wireless terminals within which the present invention operates.

FIG. 3 is used to illustrate the operations of the present embodiment. Here, MT (106) is initially associated with CN (100) and receives corresponding communications resources and QoS services from CN (100). MT (106) regularly receives QoS history information units from NC (102) of CN (100).

In the current embodiment of the invention, MT (106) moves from a first communications network of a first communications technology type, CN (100), to a second communications network of a second communications technology type, CN (300). In general, when a mobile terminal moves from a first to a second communications network it establishes a network connection in a two-step process. A mobile terminal first establishes a link transport such as selecting radio parameters, authenticating and associating itself with the new communications network. Then a mobile terminals establishes QoS service such as negotiating QoS resources, network settings etc. For example, in IEEE 802.11 WLANs, link transport establishment comprise IEEE 802.11 association and authentication, while QoS service establishment comprises IEEE 802.11e exchanges.

In FIG. 3, CN (100) is assumed to be a cellular 3G communications network while CN (300) is assumed to be an IEEE 802.11 WLAN.

When MT (106) moves from the cellular 3G network, CN (100), to the IEEE 802.11 WLAN, CN (300), it first establishes a link transport with CN (300) in accordance with the IEEE 802.11 standards specifications. This entails selecting a radio channel from the information presented in IEEE 802.11 Beacon messages or IEEE 802.11 Probe Response messages, associating with CN (300) using IEEE 802.11 Association Request and IEEE 802.11 Association Response messages and authenticating with CN (300) using IEEE 802.11 Authentication messages. In accordance with the current invention, MT (106) sends its QoS history information unit to CN (300) during link transport establishment. This information unit may be sent during the exchange of IEEE 802.11 Authentication messages between MT (106) and CN (300).

The IEEE 802.11 standards specifications allow for Extensible Authentication Protocol (EAP) packets to be transported in IEEE 802.11 data packets during the authentication exchanges. In the current invention, a QoS history information unit from MT (106) is sent to NC (302) of CN (300) using IEEE 802.11 data packets during the authentication exchanges.

Upon receiving the QoS history information unit from MT (106), NC (302) first verifies the authenticity of the information unit by communicating with AAA (140) and analyzing the time-stamp. If the verification code and time-stamp of the QoS history information unit are consistent with the expectations of the NC (302), the information unit is considered for further processing.

Figure 9:
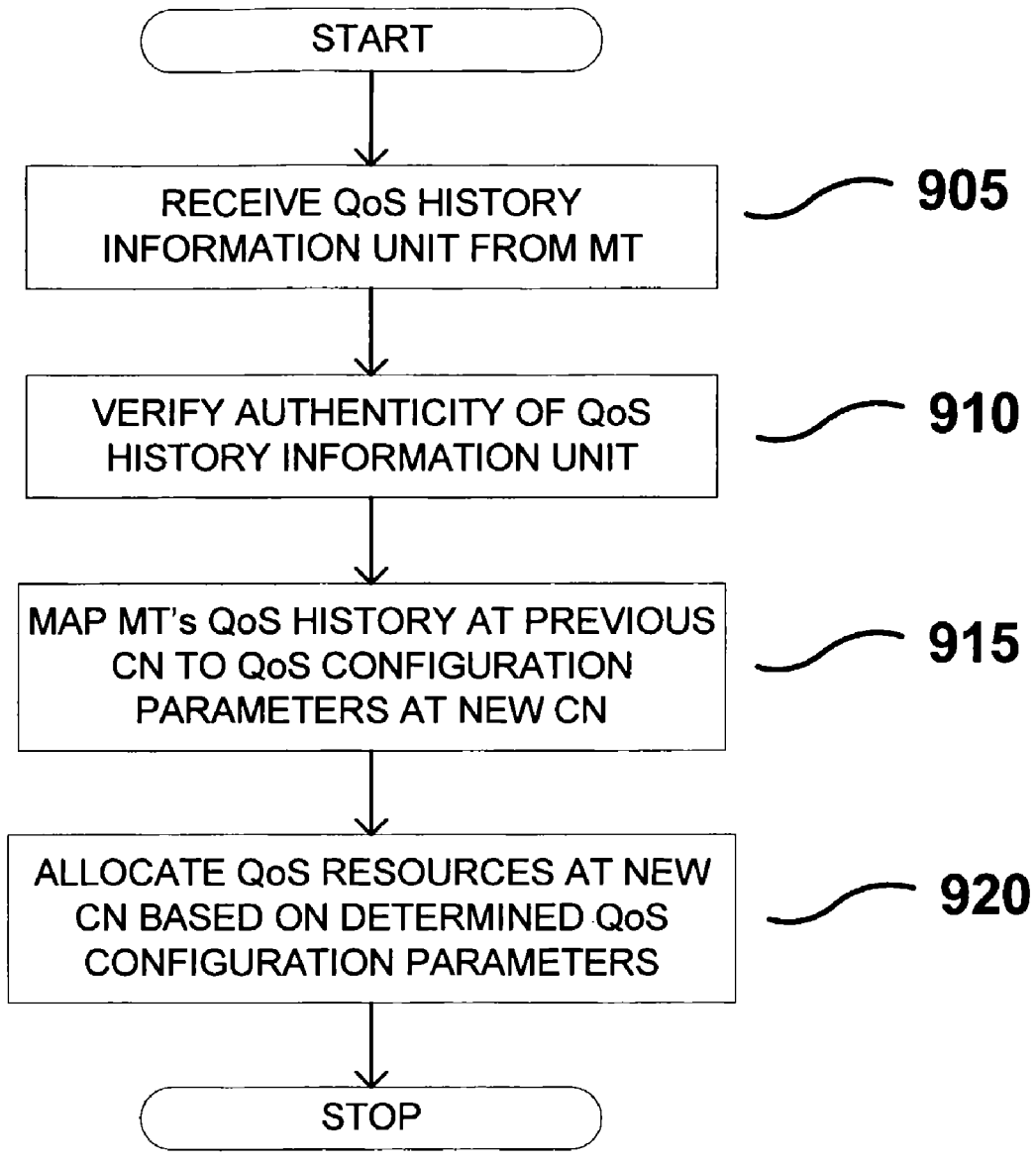
FIG. 9 illustrates a flowchart of operational steps of the disclosed invention.

FIG. 9 illustrates the control flow chart (900), of the verification process. In a step (905), the QoS history information of a mobile terminal, such as MT (106), from a first communications network, such as CN (100), is received by the network controller of a second communications network, such as NC (302) of CN (300). Then in a step (910), NC (302) verifies the authenticity of the QoS history information unit by validating the verification code and the time-stamp. The step (910) may further comprise communications with a AAA entity, such as AAA (140).

After verifying the QoS history information unit, NC (302) determines the QoS resource utilization, traffic pattern and communications performance history of MT (106). This corresponds to the step (915) in FIG. 9. In this step, NC (302) maps information from the QoS history information unit to corresponding network configuration parameters at the second communications network, CN (300). This step is to provide MT (106) with communications services at CN (300) that are consistent with those it received at the previous CN (100). Step (915) allows for MT (106) to quickly and accurately establish QoS resources at the new communications network.

Then, with the QoS history information unit, NC (302) allocates appropriate levels of QoS resources to MT (106) without requiring the IEEE 802.11e QoS exchanges as part of the QoS service establishment. This is performed in a step (920) of FIG. 9(A). The QoS resources are allocated based on configuration parameters determined in the step (915). For instance, using the QoS history information unit, NC (302) determines that MT (106) was previously serviced by a cellular 3G communications network in which the net achievable throughput would be less than that available at CN (300). NC (302) also determines that CN (100) entailed lower packet loss-rates and shorter radio access delays for MT (106). So in a preferred form of the embodiment, NC (302) of an IEEE 802.11 WLAN assigns higher radio access priorities for MT (106) so as to enable seamless communications experience for MT (106). In exemplification, higher priorities are assigned by means of short AIFSN durations. The higher priorities compensate for longer radio access delays at IEEE 802.11 WLAN as compared to the cellular 3G communications network, CN (100). The initial higher priorities may be altered after a given duration. The given duration may be predetermined or instantaneously determined by CN (300) or MT (106).

The present embodiment illustrates how MT (106) receives quicker communications services at a new communications network, CN (300), as the QoS service establishment phase is bypassed. The invention enables the QoS history information unit to aide CN (300) in determining the appropriate levels of QoS resources necessary for MT (106) without the need for QoS signaling.

CN (300) determines the appropriate QoS levels with the aim of making communications characteristics at CN (300) as consistent as possible to that of CN (100). In this process, CN (300) uses the QoS history information unit to derive configuration parameters and allocate network resources such that communications services provided to MT (106) are similar to the services received by MT (106) at the previous CN (300). According to the invention, resources are allocated so as to ensure throughput achievable at the second communications network, CN (300), is equivalent or proportionally equivalent to throughput achieved at the first communications network, CN (100). Similarly, other resources are allocated at the second communications network so as to normalize or proportionally normalize other communications metrics as provided in the QoS history information unit by MT (106).

An example of the resource allocation is provided; when MT (106) moves from a first cellular 3G communications network CN (100) to a second IEEE 802.11 WLAN CN (300), its QoS history information unit contains information on communications performance and characteristics in CN (100). In an exemplification, the QoS history information unit comprises MT (106)'s 50 Kbps average throughput, 80% average transmission success rate without retransmissions and 20 ms average transmission delay at CN (100). Upon receiving the QoS history information unit from MT (106) and reviewing the information, CN (300), in exemplification, allocates scheduling resources so as to enable MT (106) to achieve throughput of 50 Kbps. CN (300) also assigns high IEEE 802.11e priorities so as to make the average transmission success rate and average transmission delay at CN (300) match or closely correspond 80% and 20 ms, respectively, at CN (100).

Furthermore, QoS services for MT (106) are established quicker using the QoS history information unit. In the absence of the current invention, MT (106) must first map its application level needs to the network communications network. This process is complicated by the limited processing power of mobile terminals and MT (106)'s lack of accurate knowledge of the new communications network. The current invention overcomes these problems and enhances communications performance for MT (106) and CN (300).

Embodiment 4

CAPWAP

Figure 10:
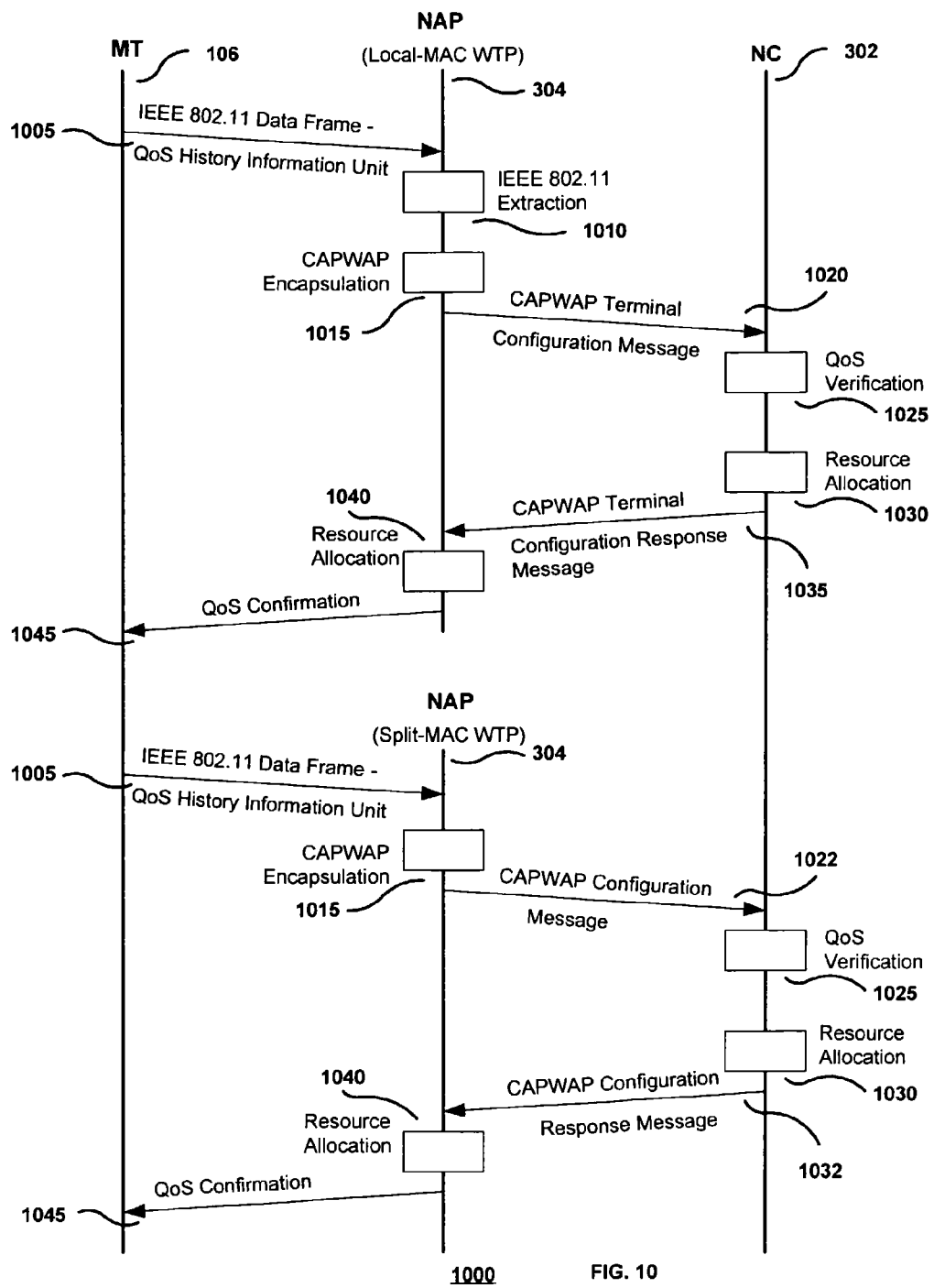
FIG. 10 depicts a sequence of operations of the invention operating in a CAPWAP framework.

In an embodiment related to the IETF CAPWAP architecture, CN (300) is representative of an IETF CAPWAP enabled communications network. Here, NAP (304) and NC (302) are representative of CAPWAP-enabled wireless termination point (WTP) and WLAN controller, respectively. FIG. 10 illustrates a message sequence (1000) in accordance with the invention. The message sequence (1000) is separated for local-MAC WTP and split-MAC WTP.

When a MT (106) moves from a previous CN (100) to new CN (300), it first establishes a link transport in accordance with IEEE 802.11 specifications. Then, MT (106) encapsulates its QoS history information unit within an IEEE 802.11 data packet (1005) as part of the authentication exchange and sends it through the IEEE 802.1X uncontrolled port.

In case of NAP (304) being a local-MAC WTP, upon receiving an IEEE 802.11 data packet containing the QoS history information unit of MT (106), the WTP extracts the information unit in a step (1010) and encapsulates it in a CAPWAP QoS Terminal Configuration message in a step (1015). The CAPWAP Terminal Configuration message (1020) is then sent to the WLAN controller, NC (302). Incase of NAP (304) being a split-MAC WTP, the IEEE 802.11 data packet containing the QoS history information is encapsulated in to a CAPWAP Configuration message in a step (1015) and forwarded to WLAN controller, NC (302), in (1022).

Upon receipt of the QoS history information unit, either in (1020) or (1022), the WLAN controller, NC (302), authenticates the information unit in a step (1025). The step comprises establishing the authenticity of the verification code and time-stamp. The verification step (1025) may involve communicating with AAA (140). This is accomplished using existing AAA access methods such as RADIUS. Then NC (302) determines and allocates the appropriate level of QoS resources for MT (106) in a step (1030). The step (1030) also involves determining resource allocation information for the WTP, NAP (304). In the case of the NAP (304) being a local-MAC WTP, the determined information is sent in a CAPWAP Terminal Configuration Response message and in the case of NAP (304) being a split-MAC WTP, the determined information is sent in a CAPWAP Configuration Response message. After receiving the QoS resource allocation information, NAP (304) then establishes the appropriate QoS settings in a step (1040). NAP (304) communicates the QoS settings with MT (106) in a QoS confirmation message encapsulated in accordance with IEEE 802.11 standards specifications, such as with an IEEE 802.11 data message or with an IEEE 802.11 Probe Response message (1045).

This embodiment illustrates how the present invention operates in the IETF CAPWAP context. It shows that the CAPWAP protocol may use the QoS history information unit to enhance communications performance for MT (106) and CN (300).

Figure 11:
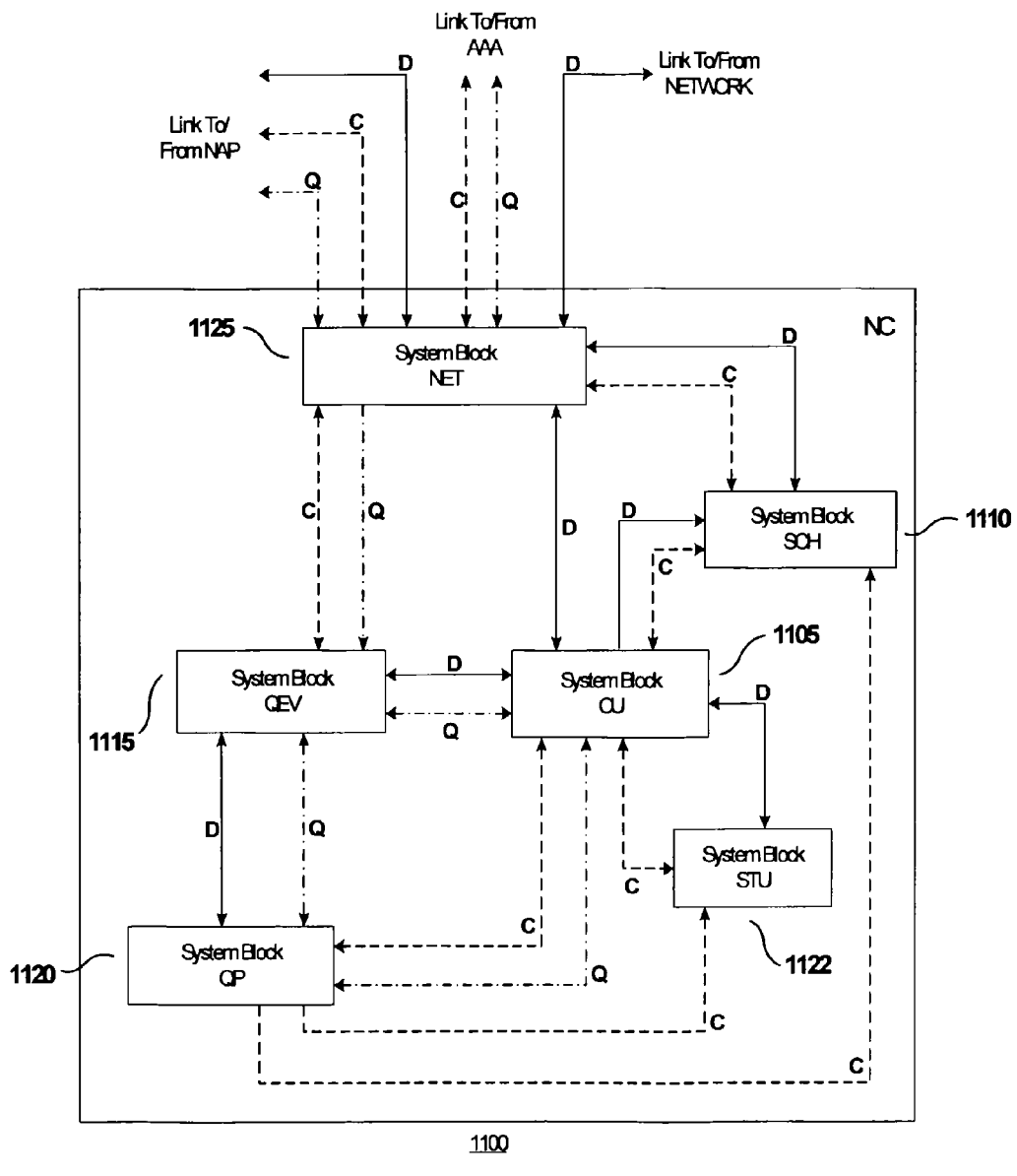
FIG. 11 illustrates an apparatus of a network controller (NC) in accordance with the present invention.
Figure 12:
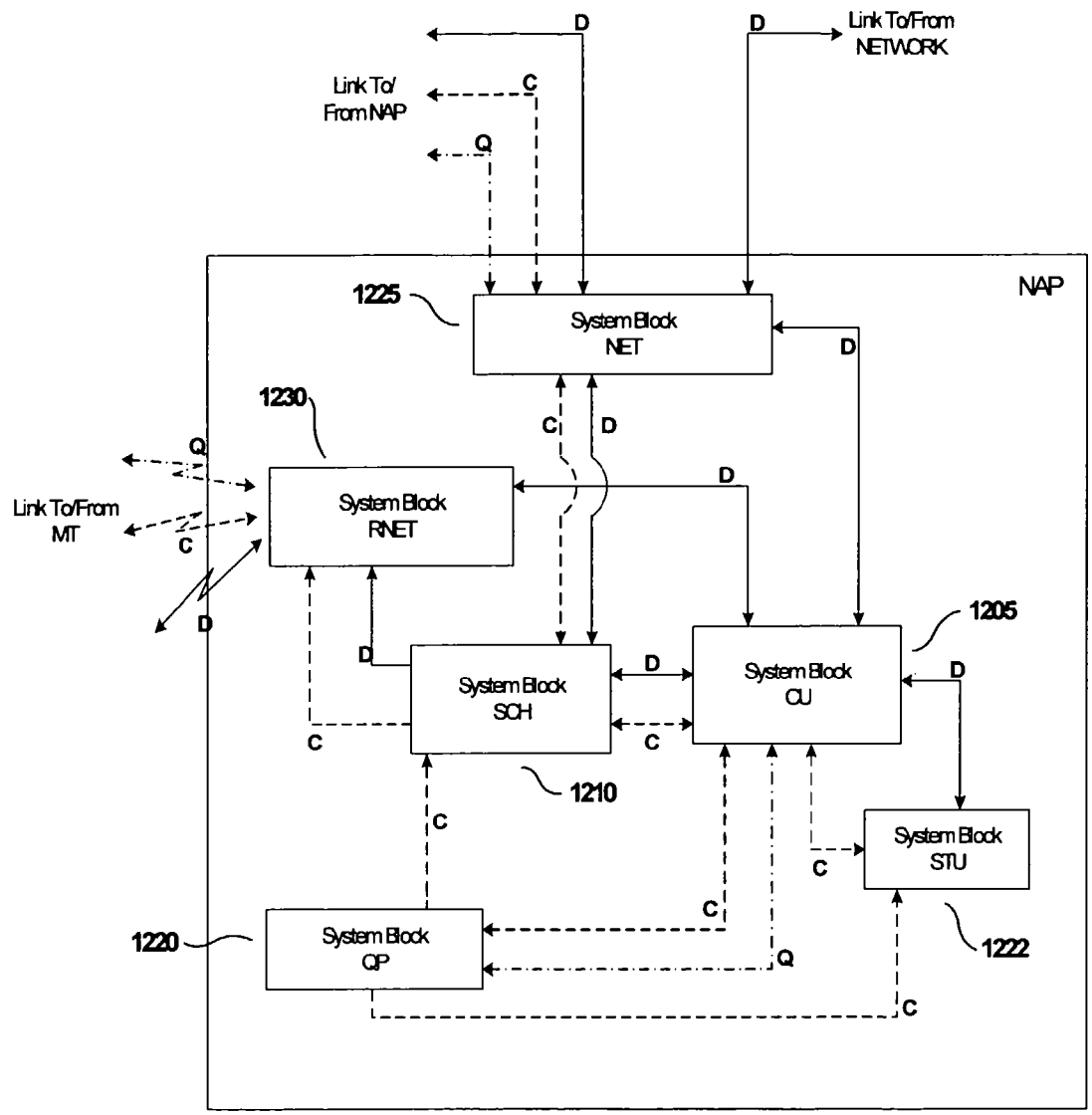
FIG. 12 illustrates an apparatus of a network attachment point (NAP) in accordance with the present invention.

FIG. 11 and FIG. 12 illustrate apparatuses of a network controller (1100) and network attachment point (1200), respectively, that are embodiments of the present invention for QoS verification and fast establishment. These are used to illustrate operations of subsequent embodiments.

Network controller NC (1100) comprises a number of system blocks such as the Network system block (NET) (1125), which sends and receives data, general control and QoS control communications frames from other network entities such as NAP, AAA and other networks. Communications frames are exchanged between system blocks on paths corresponding to they type of frames. Consequently, there are three types of paths that are marked with 'D', 'C' and 'Q', to denote exchange of data, general control and QoS control communications frames, respectively. NET (1125) may operate based on any communications standards such as IEEE 802.11, Ethernet and IEEE 082.16. All communications frames received by NET (1125), comprising data, general control and QoS control frames, are appropriately forwarded to other system blocks such as Controlling Unit (CU) (1105), QoS Evaluator (QEV) (1115) or Scheduler (SCH) (1110) via the data, general control or QoS control paths.

CU (1105) is the main management system block. It performs computations and processing necessary for the overall control of the communications network. It also comprises a timer module. CU (1105) coordinates and supervises the operations of system blocks within NC (1100) and also other network elements within the communications network such as NAPs. General control signals are coordinated using the 'C' path while QoS control signals are coordinated using the 'Q' path. CU (1105) interfaces with SCH (1110), over 'D' and 'C' paths, to transmit and receive data and control communications frames. SCH (1110) manages a single or plurality of queues and enforces priorities among them. The Scheduler SCH (1110) interacts closely with NET (1125), over 'C' and 'D' paths, and with CU (1105), over 'C' path.

The Storage Unit STU (1122) comprises buffer or memory modules to store data and control information. STU (1122) and CU (1105) are interfaced by 'D' and 'C' paths.

In accordance with the invention, the QoS Evaluator QEV (1115) and QoS Processor QP (1120) are the main system blocks. It is the responsibility of QEV (1115) to verify the authenticity of QoS history information units received from NET (1125), over the 'Q' path, in coordination with CU (1105), over the 'Q' path. QEV (1115) processes the verification code with input received from the AAA server over the 'C' path. This system block comprises computing a similarity function to determine the authenticity of QoS history information units. QEV (1115) also verifies the time-stamp of QoS history information units to ensure that QoS history information units are recent and accurate representations of a wireless mobile user's communications performance in a previous communications network. This is done in coordination with the timer module of CU (1105) over the 'Q' path. The outcome of QEV (1115)'s evaluation is sent to CU (1105) and the QoS Processor QP (1120), both over the 'Q' paths.

QP (1120) is responsible for quickly allocating appropriate QoS resources to a new MT such that communications performance at the new communications network is consistent with that at the previous communications network. QP (1120) determines the appropriate amounts of buffer usage, priority levels, scheduling attributes, bandwidth reservations and other parameters. It then corresponds with other system blocks such as the Controlling Unit, Scheduler and Storage unit, over their respective 'C' paths, to allocate corresponding QoS resources to the particular MT.

Network attachment point NAP (1200) of FIG. 12 comprises similar system blocks to NC (1100) with the exception of the QEV (1115). QEV (1115) is only present in NC (1100) as the sole system block that processes QoS history information units. The system blocks of NAP (1200) have similar functionalities but with limited scope as compared to those of NC (1100). This is because system blocks of NAP (1200) are only concerned with the operations of NAP (1200). System blocks of NC (1100) on the other hand are concerned with the operations of the communications system as a whole including the numerous NAPs and as a result have greater scope and capabilities. NAP (1200) additionally comprises a Radio Network (RNET) (1230) system block to communicate with mobile terminals. RNET (1230) may communicate with MTs using a single or plurality of communications protocols such as IEEE 802.11, IEEE 802.16, GPRS and WCDMA.

So in accordance with the embodiment relating to CAP-WAP, NET (1225) of NAP (1200) first receives the QoS history information unit within an IEEE 802.11 data frame through the uncontrolled port. The IEEE 802.11 data frame is then passed to the Controlling Unit CU (1205). If NAP (1200) is a local-MAC WTP, CU (1205) extracts the QoS history information unit from the IEEE 802.11 data frame and performs an extraction step (1010) followed by encapsulation in a CAPWAP Terminal Configuration message in a step (1015). If NAP (1200) is a split-MAC WTP, CU (1205) encapsulates the entire IEEE 802.11 data frame in a CAPWAP Configuration message in a step (1040).

The encapsulated CAPWAP messages are then sent to the Scheduler SCH (1210) for transmission scheduling. SCH (1210) then sends the messages to NET (1225) for transmission to the network controller in either (1020) or (1022), depending on the type of WTP, either local-MAC WTP or split-MAC WTP, respectively.

NC (1100) receives the CAPWAP message through NET (1125) before passing it to CU (1105). The Controlling Unit then extracts the QoS history information unit and sends it to the QoS Evaluator QEV (1115) for verification. After verification, QP (1120) determines appropriate QoS resource levels and makes corresponding allocations.

Embodiment 5

Re-Establishment Sequence

Figure 4:
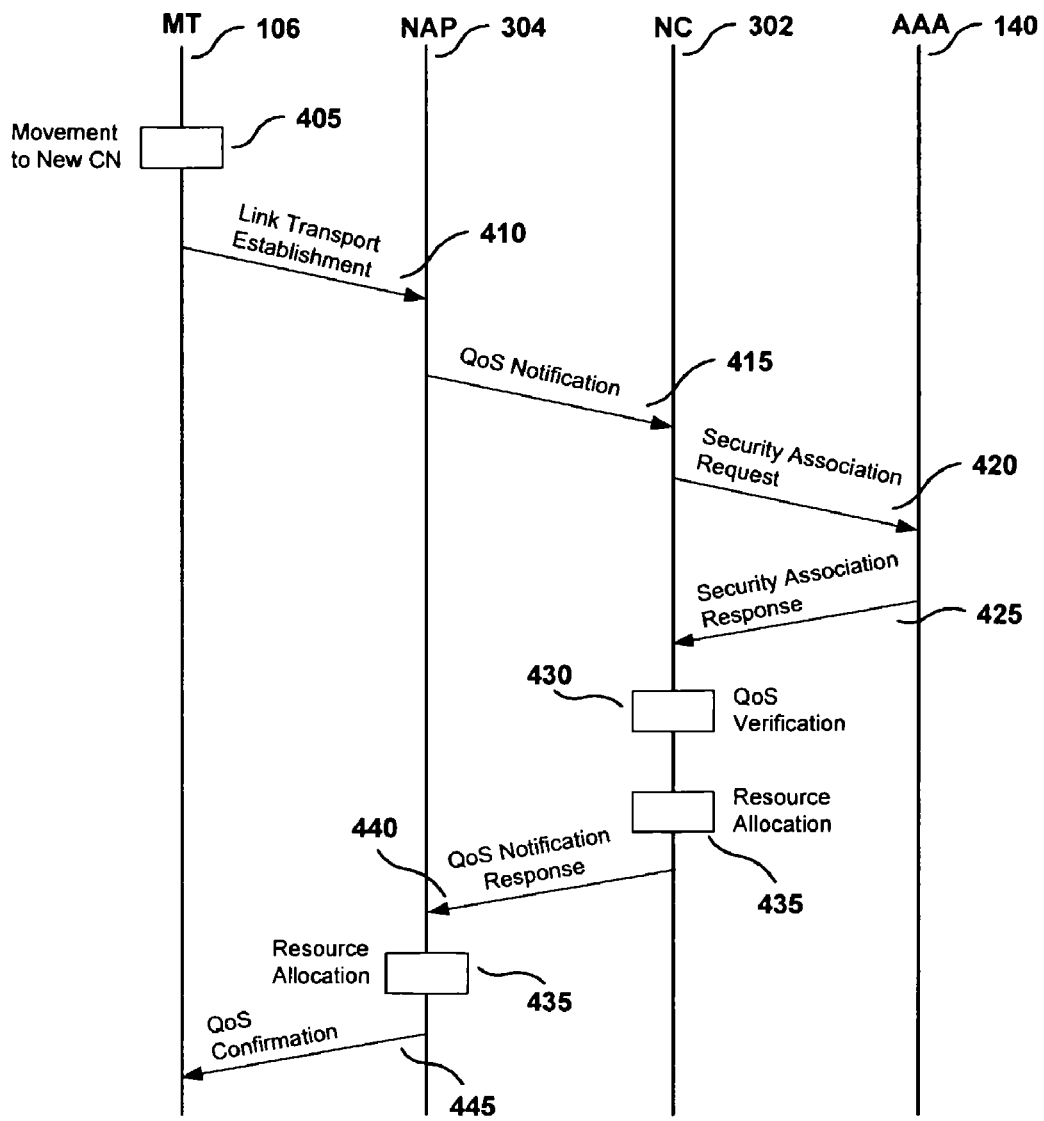
FIG. 4 depicts a sequence of operations of the invention operating within heterogeneous communications networks.

The sequence of operations for the fast establishment of QoS embodiment is described hereinafter with aid of FIG. 4. The operations commence when the mobile terminal, MT (106), moves from a first communications network, CN (100), to a second communications network, CN (300), in a step (405). The movement may be a soft handover between the communications networks or an explicit disconnection with CN (100) followed by a connection with CN (300). The invention applies to all cases where mobile terminals move from one communications network to another.

Upon moving to a new communications network, CN (300), MT (102) first establishes a link transport with it. So in a step (410), MT (102) sends link transport establishment messages. The operations comprising step (410) are specific to the technology of CN (300). So in the case of IEEE 802.11 WLANs, step (410) comprises exchanges of IEEE 802.11 Probe, Association and Authentication messages. In the case of cellular 3G communications networks, step (410) comprises exchanges in the dedicated control channel (DCCH), dedicated traffic channel (DPDCH) and broadcast control channel (BCCH). In all cases, step (410) also comprises MT (106) sending its QoS history information unit in a QoS History message encapsulated in the technology specific transport. The QoS History message has a Type field (1405) value of '5'. This message comprises a QoS history information message element (1420) that contains the information unit. The step (410) is performed between MT (106) and the Radio Network system block RNET (1230) of NAP (304).

In a step (415), NAP (304) sends the QoS history information unit to NC (302) in a QoS notification message, with Type field (1405) value of '7' and message element (1420) comprising the information unit. The QoS notification message may be transported from NAP (304) and NC (302) using the IETF CAPWAP protocol, GPRS Gs interface, GPRS Gb interface or other transport protocols used between NAP (304) and NC (302). This step is performed between NET (1225) of NAP (304) and NET (1125) of NC (302).

Upon receiving the QoS history information unit of MT (106), NC (302) must verify its authenticity. So in a step (420), NC (302) sends a security association request message to AAA (140), which comprises a query based on the QoS history information unit. AAA (140) sends a reply to the query in a security association response message in a step (425). The steps (420) and (425) may be part of RADIUS exchanges between NC (302) and AAA (140).

Figure 13:
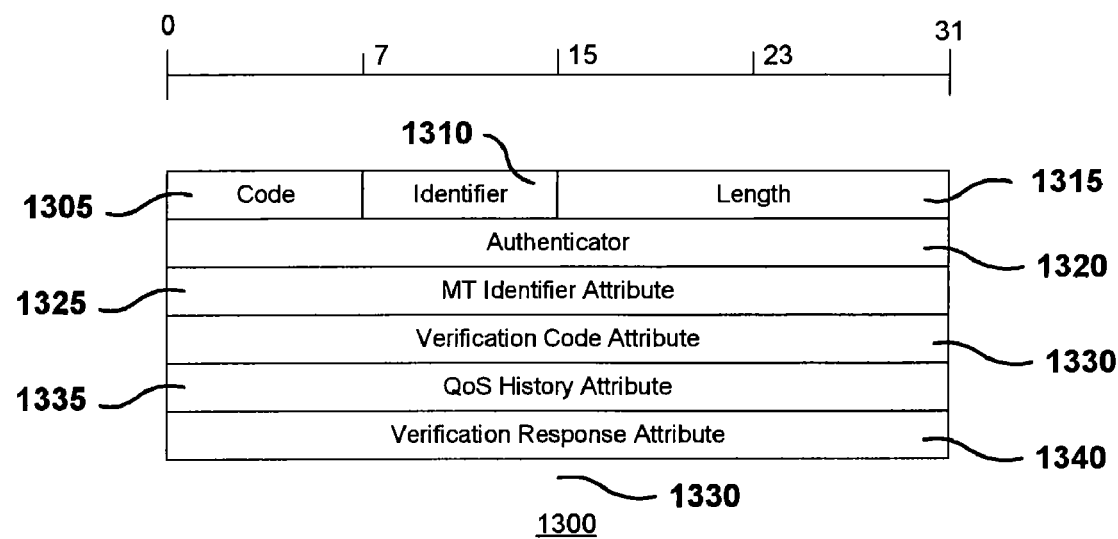
FIG. 13 depicts a Security Association message structure in accordance with the invention.

FIG. 13 illustrates a structure (1300) of the query and response of the security association exchanges (420) and (425). The message structure is similar to that of RADIUS packets and extends current RADIUS definitions. If RADIUS is not used for message exchanges (420) and (425), then the message structure (1300) is transported over UDP or TCP between NC (302) and AAA (140).

The 1-byte Code Field (1305) denotes the type of RADIUS message and is assigned a value currently unassigned by the Internet Assigned Numbers Authority (IANA). The value may be '254' to signify a Security Association Request message (420) and '255' to signify a Security Association Response message (425).

The next 1-byte field Identifier (1310) is used to match corresponding Security Association Request (420) and Security Association Response (425) messages. The 2-bytes Length Field (1315) illustrates the total length of the Security Association packet. Next, the 4-bytes Authenticator Field (1320) contains a shared secret between the NC (302) and AAA (140) and used to authenticate each of the Security Association Request (420) and Security Association Response (425) messages.

Subsequent to the Authenticator Field (1315) are the Attributes used to identify the exact nature of the message. Each attribute is assigned an attribute type code with a value currently unassigned by IANA. A first attribute is the MT Identification (1325), with type code '244', which serves to identify the MT (106) for which the corresponding Security Association message structure (1300) is used. The value may correspond to that of the Medium Access Control (MAC) address. The Verification Code (1330) attribute, with type code '245', contains the verification code received by NC (302). Upon receipt of such an attribute, AAA (140) compares the MT Identification (1325) and Verification Code (1330) values with its own records for verification. The response of this comparison, either positive or negative, is sent using the Verification Response (1340) attribute with type code '247'.

In an alternative embodiment, NC (302) sends a QoS History (1335) attribute, with type code '1335', containing the QoS history information unit received from MT (106). Upon receipt of a Security Association Request (420) with this attribute, AAA (140) derives the verification code using the corresponding hash function over the entirety of the information unit. The resulting fixed-length verification code is sent to the NC (302) in a Security Association Response (425) message containing the Verification Response (1340) attribute.

With the Security Association Response message from AAA (140), containing a Verification Response (1340) attribute, NC (302) verifies the authenticity of the QoS history information unit in a step (430). The QoS verification step (430) is performed by the QoS Evaluator system block QEV (1115) of NC (302). This verification step takes in to account the time-stamp and the verification code. NC (302) may also use network identifications, MAC addresses and other identifications to verifying QoS history information unit.

After the verification step, NC (302) performs resource allocation in a step (435). This step is dependent on the verification step of (430) in that positive verification will result in the appropriate QoS resources being provisioned and negative verification will result in minimal QoS resources being provisioned. Step (435) comprises computing appropriate priority levels, determining durations of transmission opportunities and assigning network resources for MT (106) to be consistent with its QoS history information unit. This resource allocation step (435) is performed by the QoS Processor system block QP (1120).

NC (302) sends a QoS notification response message to NAP (304) in a step (440). The QoS notification response message has a Type field (1405) value of '8'. This message informs the NAP (304) on the outcome of the verification step (430) and resource allocation step (435). The QoS notification response message also comprises QoS parameters and instructions, within the message element (1420) fields, for NAP (304) and MT (106). The QoS parameters are included in the message elements (1420) and comprise transmission priorities, buffer space allocation, transmission rate assignment, transmission duration assignment etc. The QoS instructions included in the message elements (1420) of the QoS notification response message (440) comprises instructions on how NAP (304) assigns relative priorities, allocates resources for existing MTs, error handling etc.

The exchange of (440) is performed between NET (1125) of NC (302) and NET (1225) of NAP (304).

After receiving a QoS notification response message, NAP (304) performs its own resource allocation step (435) performed by its QoS Processor QP (1220). Given a positive verification of the QoS history information unit, step (435) serves to provide consistent communications performance to MT (106).

NAP (304) then sends a QoS confirmation message to MT (106) in a step (445). Step (445) is scheduled by SCH (1210) of NAP (304) and performed between RNET (1230) of NAP (304) and a corresponding system block of MT (106). Similar to step (410), the operations comprising step (445) are dependent on the communications technology of CN (300). After completion of step (445), MT (106) begins to receive communications services from CN (300) in a manner consistent with that received at its previous communications network.

Embodiment 6

Efficient QoS Allocation

In another embodiment of the invention pertaining to efficient QoS resource utilization, the QoS history information unit is used to allocate appropriate levels of QoS and network resources to deliver consistent or seamless communications performance to mobile terminals.

Following FIG. 3, in accordance with the current embodiment, the second communications network, CN (300), attempts to adjust its network parameters and settings so as to deliver consistent communications performance to a mobile terminal, MT (106), moving from a first communications network, CN (100). The second communications network effects the adjustments based on the QoS history information unit made available from MT (106). These steps are performed by the QoS Processor QP (1120) of NC (302) of the second communications network, CN (300).

In accordance with the invention, when MT (106) moves between communications networks that deliver similar communications performance, the second CN (300) will adjust its network parameters and settings such that MT (106) achieves communications performance equivalent to that it achieved at the first CN (100). For example, if throughput achieved at the first CN (100) can be achievable at the second CN (300), then CN (300) delivers said throughput. Similarly for delay, loss rates and other performance metrics.

If MT (106) moves from a first CN (100) delivering superior communications performance, such as higher throughput, lower delay, lower loss rates etc, as compared to a second CN (300), then CN (300) initially adjusts network parameters and settings so as to allocate additional resources such that MT (106) achieves communications performance as similar as possible to that it achieved at the first CN (100). For example, if throughput achieved at the first CN (100) is greater than that can be achieved at CN (300), CN (300) allocates additional resources to MT (106). If delay or loss rates encountered at the first CN (100) are lower than the delay encounterable at CN (300), CN (300) may assign higher priorities or longer transmission periods, respectively, to MT (106) for compensation.

If MT (106) moves from a first CN (100) delivering inferior communications performance, such as lower throughput, higher delay, higher loss rates etc, as compared to a second CN (300), then CN (300) initially adjusts network parameters and settings such as MT (106) continues to receive similar communications performance as CN (100) for an initial duration after which they are readjusted to higher communications performance levels. For example, if throughput achieved at the first CN (100) is lower than that can be achieved at the second CN (300), CN (300) allocates only sufficient resources so as to match throughput levels at CN (100). This is to ensure efficient allocation among all MTs arriving with varying levels of communications performances at respective previous communications networks.

In the following, specific instances of efficient QoS resource utilization in accordance with the invention are disclosed.

If MT (106) moves from a cellular 3G CN (100) to an IEEE 802.11 CN (300), CN (300) provisions higher EDCA priorities and longer transmission opportunities (TXOPs) to compensate for greater channel loss, more retransmissions and longer delays at CN (300).

If MT (106) moves from a home IEEE 802.11 CN (100), at which achievable throughput is high due to limited contention and load, to an office IEEE 802.11 CN (300), at which achievable throughput is low due to greater contention and load, CN (300) provisions higher EDCA priorities and longer TXOPs to compensate for lower throughput available.

If MT (106) moves from an IEEE 802.11 CN (100) to a cellular GPRS CN (300), CN (300) assigns a CS-4 or alternative channel coding scheme and multiple packet data traffic channels to MT (106) to compensate for lower throughput available at CN (300).

The adjusted network parameters are maintained at the second communications network, CN (300), for a fixed duration. The fixed duration may be pre-determined at the time of associating MT (106) with CN (300) or may be instantaneously determined upon an external trigger or otherwise determined based on network policies. The QoS Processor QP (1120) of NC (302) is responsible for maintaining the adjusted network parameters at the second communications network, CN (300).

The current invention ensures that the critical period, during and immediately after MT (106) moving from a first communications network CN (100) to a second communications network CN (300), is one in which MT (106) communications services. Furthermore, the invention prevents the adverse effects of abrupt changes in network conditions. So MT (106) is provided with a buffer period in which its applications may adapt to actual conditions of the new communications network CN (300).

Figure 5:
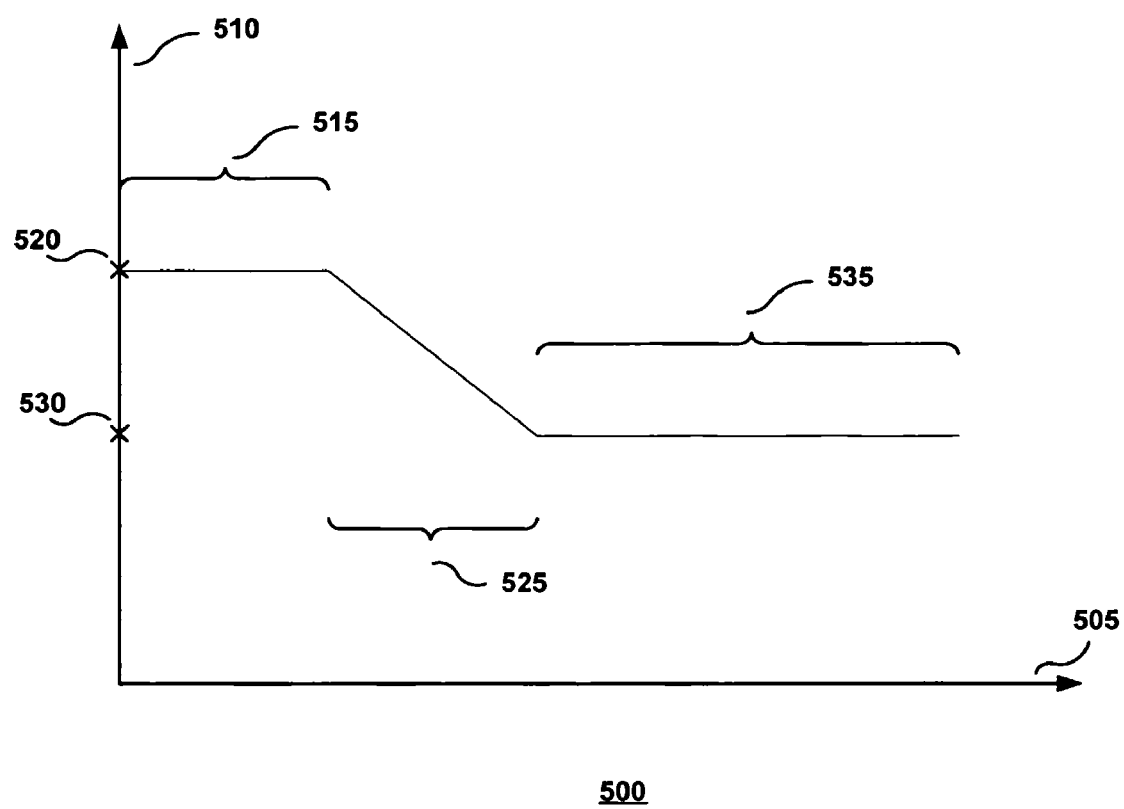
FIG. 5 depicts a graphical representation of resource allocation adjustments in accordance with the present invention.

FIG. 5 exemplifies the change in network adjustments, particularly QoS and network resource allocations, corresponding to the invention. Graph (500) is illustrative of an example of how network adjustments are varied over time. Here, the x-axis (505) is representative of the time duration since MT (106) first associates with CN (300) and the y-axis (510) is representative of the level of QoS and network resource allocations to MT (106) by CN (300).

Initially, during time period (515), MT (106) arrives at CN (300) from CN (100) and begins to receive communications services. The resource level (520) during time period (515) is consistent with that of the resource level received by MT (106) at its previous communications network CN (100). Resource level (520) is a determination comprising the QoS history information unit of MT (106), inherent network characteristics of CN (300) and prevailing network conditions at CN (300). Time period (515) provides MT (106) with opportunities to adjust its applications and the user's expectations to the actual characteristics and conditions of CN (300). It represents a transition period of MT (106)'s communications with CN (300).

Next in the time period (525), QoS resources for MT (106) at CN (300) are adjusted from resource level (520) to resource level (530). The relative positions of resource levels (520) and (530) in FIG. 5 may be altered while still adhering to the invention. QoS and network resources are gradually adjusted during the time period (525). The gradual adjustment may follow an alternative path from that illustrated in FIG. 5.

In the time period (535), QoS resources for MT (106) are adjusted according to the actual prevailing conditions of CN (300). The corresponding resource level (530) is representative of the steady state conditions of CN (300).

This embodiment illustrates how the present invention overcomes the problems of abrupt changes in network conditions faced by mobile wireless user terminals. Resource levels are gradually adjusted to deliver consistent communications performance to mobile terminals.

Embodiment 7

NSIS

Figure 6:
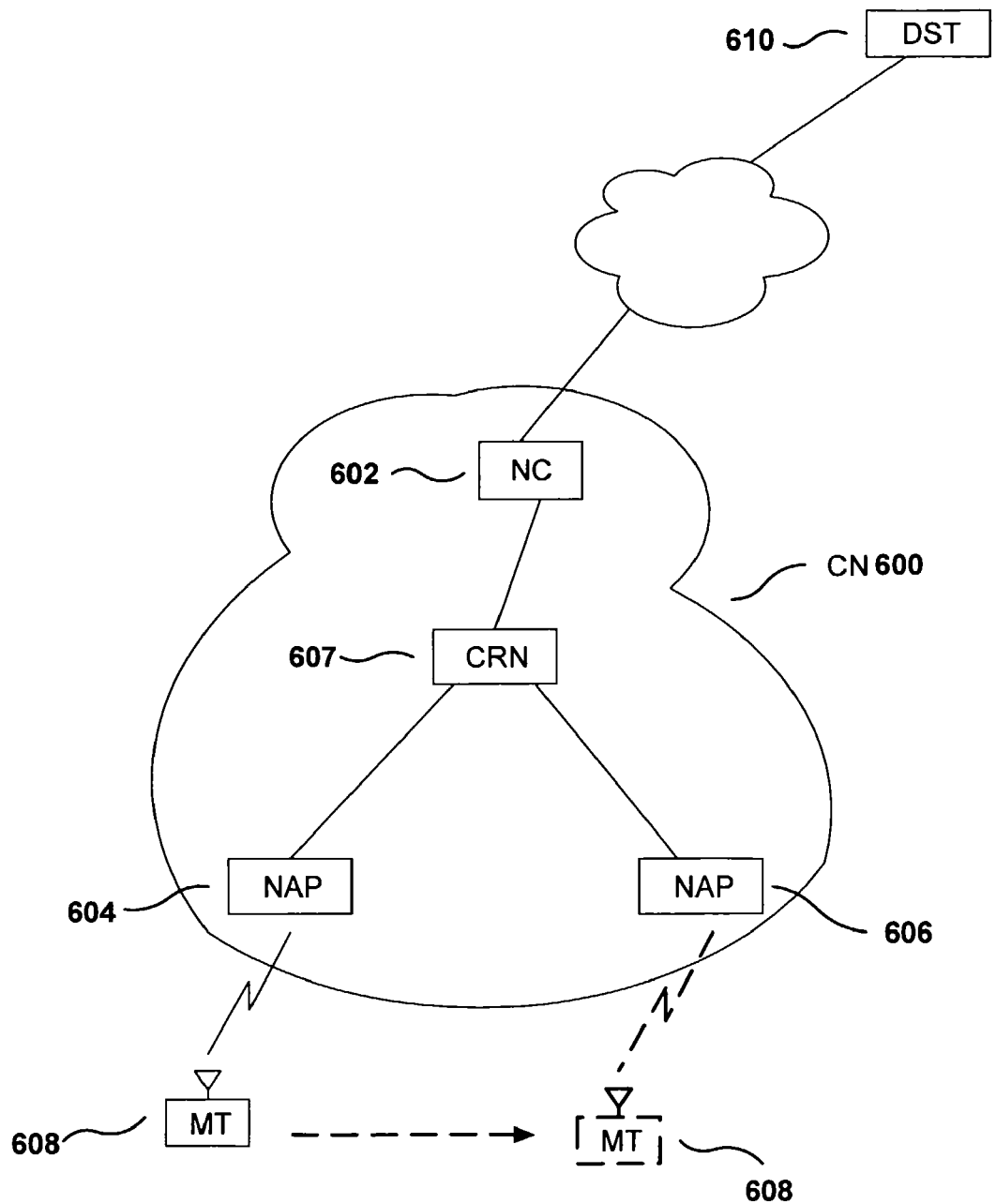
FIG. 6 illustrates a communications network and mobile wireless terminal within which the present invention operates.

In another embodiment of the invention corresponding to the IETF NSIS framework, the use of QoS history information enhances service establishment for a moving MT and reduces initial signaling overhead. The embodiment is described hereinafter with reference to CN (600) in FIG. 6 and the message sequence (1500) of FIG. 15. Here, MT (608) is a NSIS-enabled mobile terminal that is initially attached to CN (600) through a NSIS-enabled NAP (604). MT (608) has a NSIS path established with its destination DST (610). DST (610) may be within or outside CN (600).

MT (608) then moves from its initial attachment point NAP (604) to another NSIS-enabled attachment point NAP (606). At first, MT (608) performs a link transport establishment step of (410) in FIG. 15 in accordance with the communications protocol used between MT (608) and NAP (606). As a result of this move, the path characteristics between MT (608) and its destination DST (610) have changed. Crossover node CRN (607) represents the explicit network location from which the NSIS path changes due to movement of MT (608).

According to IETF NSIS specifications, when MT (608) moves from NAP (604) to NAP (606), it must first determine the characteristics of the new network path to its destination DST (610). So in accordance with NSIS specifications, MT (608) creates Path QUERY messages, comprising QSPECs to determine path characteristics. These are then passed to the NS IS GIMPS transport mechanism via an application programming interface (API). The Path QUERY messages are then sent to the new NAP (606) in a step (1505). NAP (606) processes the QUERY messages and forwards them to CRN (607) in step (1510). CNR (607) reviews the QUERY message and provides information regarding the network state, comprising bandwidth availability, priority mapping, path loss and delay characteristics etc. in its RESPONSE message in step (1515). The RESPONSE is reviewed by NAP (606) and any additional information is included before forwarding the RESPONSE to MT (608) in a step (1520). After the exchange of NSIS Path QUERY and RESPONSE messages, appropriate QoS and network resources are provisioned by NAP (606) and NC (602). The exchange of NSIS Path Query messages before resource provisioning leads to long service establishment time at NAP (606).

Figure 15:
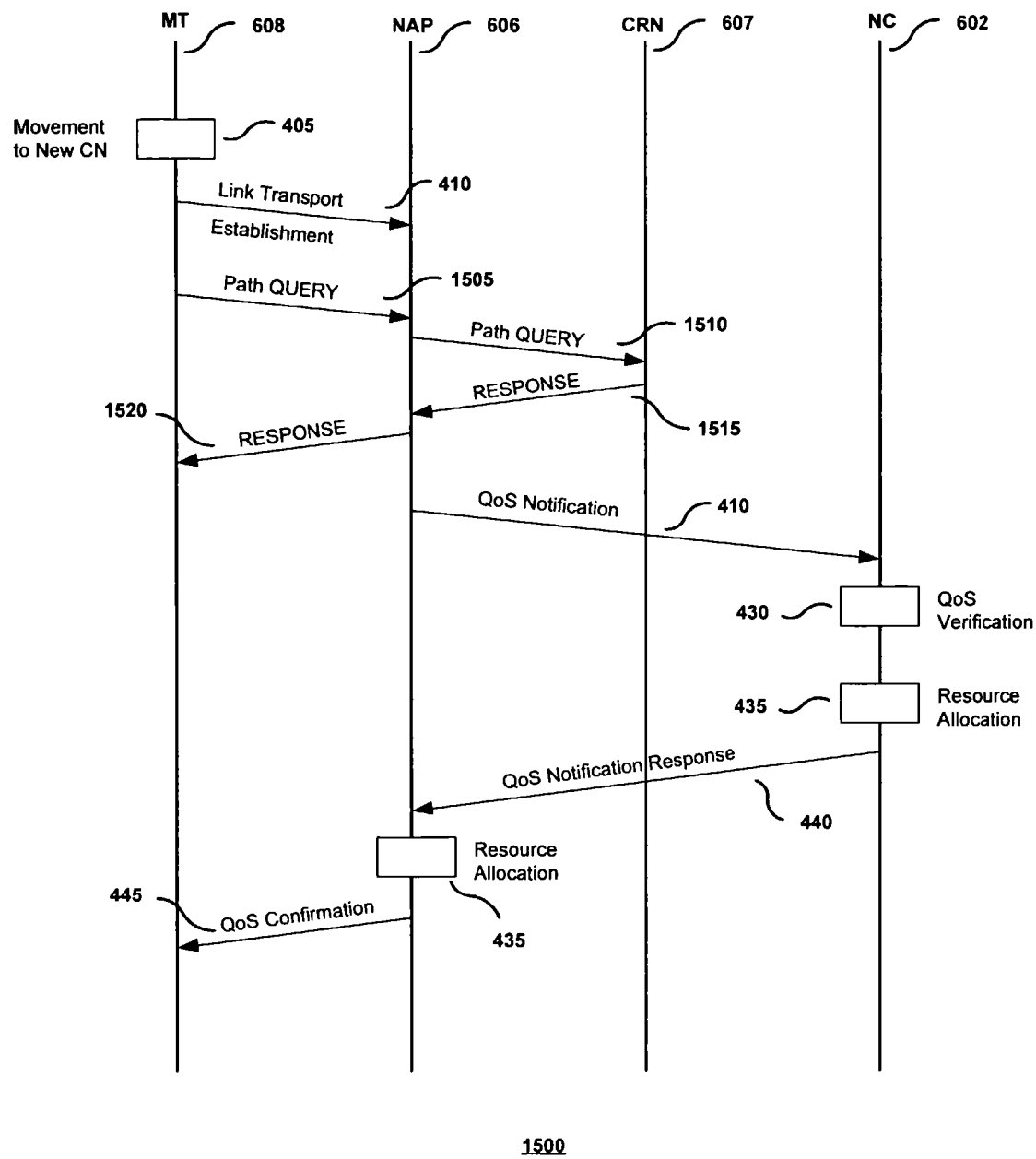
FIG. 15 illustrates a sequence of operations of the invention operating in a NSIS framework.

According to the current invention, MT (608) first sends its QoS history information unit to NAP (606), which is received by RNET (1230) of NAP (606), accompanying the link transport establishment step (410) of FIG. 15. The information unit provides adequate information to determine QoS resources required for consistent communications performance for MT (608). Then bypassing the NSIS Path QUERY and RESPONSE exchanges, NAP (606) sends the QoS history information unit to NET (1125) of NC (602). This is sent in a QoS Notification message (415). Upon receiving the information unit, QEV (115) of NC (602) evaluates its authenticity and passes it to QP (1120) in order to determine appropriate QoS and network resources to deliver consistent communications performance for MT (608). These operations comprise the step (1525) of message sequence (1500). The determined resource parameters are then sent to NAP (606) and exchanged between NET (1125) of NC (602) and NET (1225) of NAP (606). The resource parameters are sent in a QoS Notification Response message (440).

Then QP (1220) of NAP (606) uses the QoS and network resource parameters in order to provision appropriate QoS and network resources, in a step (435), to deliver consistent communications performance to MT (608). As a result of the invention, the exchange of Path Query messages between MT (608) and NAP (606) is avoided. This leads to quicker service establishment time and consequently consistent communications performance. At a later instance, NAP (606) may adjust the QoS and network resources to reflect actual network conditions. At that instance MT (608) will be capable of adapting its application needs and user expectations accordingly.

This embodiment illustrates how the present invention bypasses signaling overhead, particularly the Path QUERY and RESPONSE exchanges, in the NSIS framework and quickens the service establishment time for NSIS-enabled mobile terminals.

Embodiment 8

Scalable AV

In one embodiment of the invention corresponding to scalable audio video (AV), the QoS history information unit is used to enhance the performance of streaming applications such as streaming audio or streaming video. The embodiment is described in relation to FIG. 3 and message sequence (1600) of FIG. 16. Here, CN (100) is considered to be an IEEE 802.11 WLAN capable of delivering high throughput and CN (300) is considered to be a cellular 3G communications network capable of delivering relatively lower throughput. MT (106) is considered to be using a streaming application.

Figure 16:
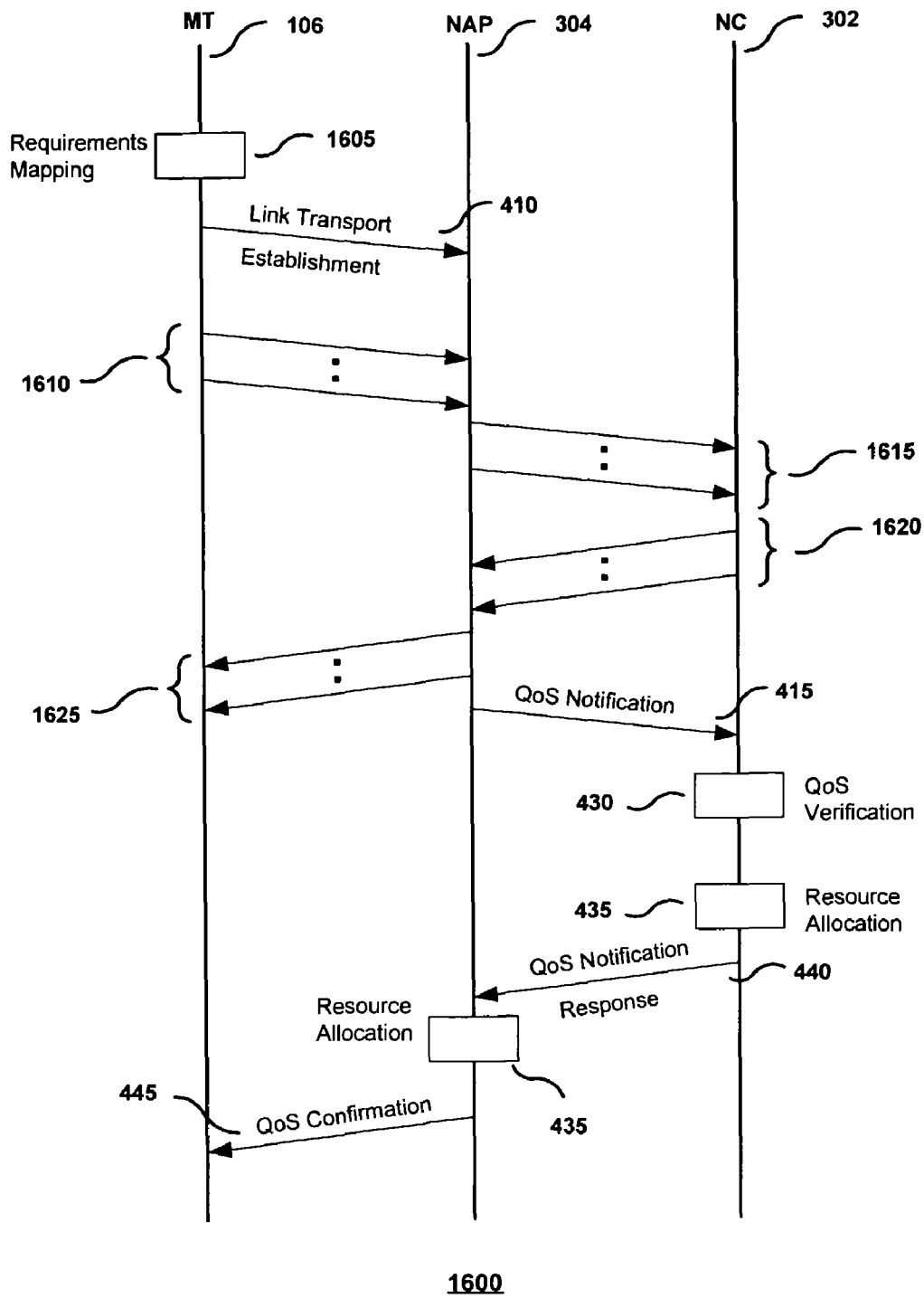
FIG. 16 depicts a sequence of operations of the invention operating in a scalable audio-visual network framework.

According to prior arts, when MT (106) moves from NAP (104) in CN (100) to NAP (304) in CN (300), it must first map the streaming application QoS requirements to the new cellular 3G link characteristics in a step (1605) of FIG. 16. The step comprises mapping application throughput, delay, jitter and loss rate requirements with available bit rates, priority levels, SDU size etc. at CN (300). MT (106) must then negotiate corresponding cellular 3G QoS parameters such as Radio Access Bearer parameters, PDP Context Request and PDP Context Modification with NAP (304) and NC (302) of CN (300). Message sequence (1600) illustrates these as the exchange of negotiation request (1610) and (1615) and negotiation response (1620) and (1625). The extended duration required for service establishment at CN (300) leads to adverse effects on streaming application performance.

In accordance with the current invention, when MT (106) moves to NAP (304), it first sends its QoS history information unit accompanying the link transport establishment step (410), which it received in CN (100) by RNET (1230) of NAP (104). The QoS history information unit indicates to the QoS Processor QP (1120) of NC (302) of the cellular 3G CN (300), the service history of MT (106). In particular, the information unit indicates that MT (106) received relatively high throughput at CN (100) and encountered high packet loss-rates and high retransmission attempts.

The information unit is forwarded by NAP (304) in the QoS Notification message (415), which is then verified and correspondingly used to allocate QoS resources by NC (302) in steps (430) and (435) respectively. Subsequently, the QoS Notification Response message (440) is sent to NAP (304) for it to perform its own resource allocation step (435). So in using the QoS history information unit, NAP (304) and NC (302) of the cellular 3G CN (300) adjust QoS and network resources without requiring signaling and negotiations with MT (106). In particular, NC (302) adjusts the Radio Access Bearer parameters for MT (106) to proportionally correspond to those at CN (100). The corresponding PDP Context Response is then generated and sent to MT (106). As a result, the exchange of negotiation request (1610) and (1615) and negotiation response (1620) and (1625) are bypassed.

The embodiment illustrates how the invention improves service establishment time and consequently improves streaming application performance in cases of mobility across different communications networks.

Embodiment 9

Three Networks

Figure 7:
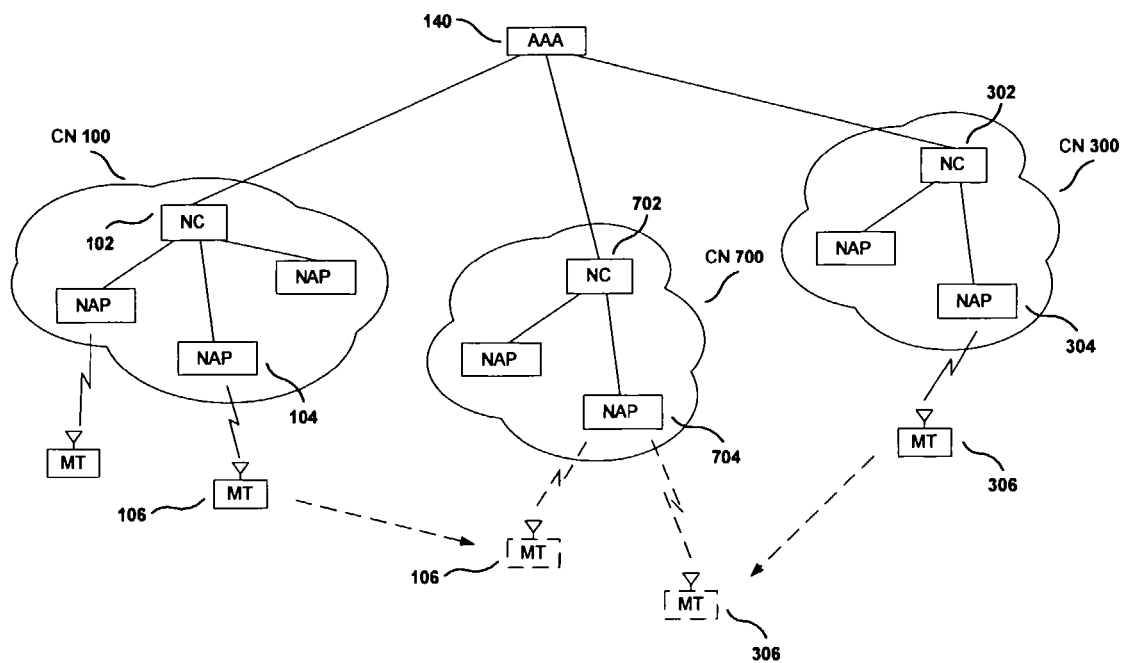
FIG. 7 illustrates heterogeneous communications networks and mobile wireless terminals within which the present invention operates.
Figure 17:
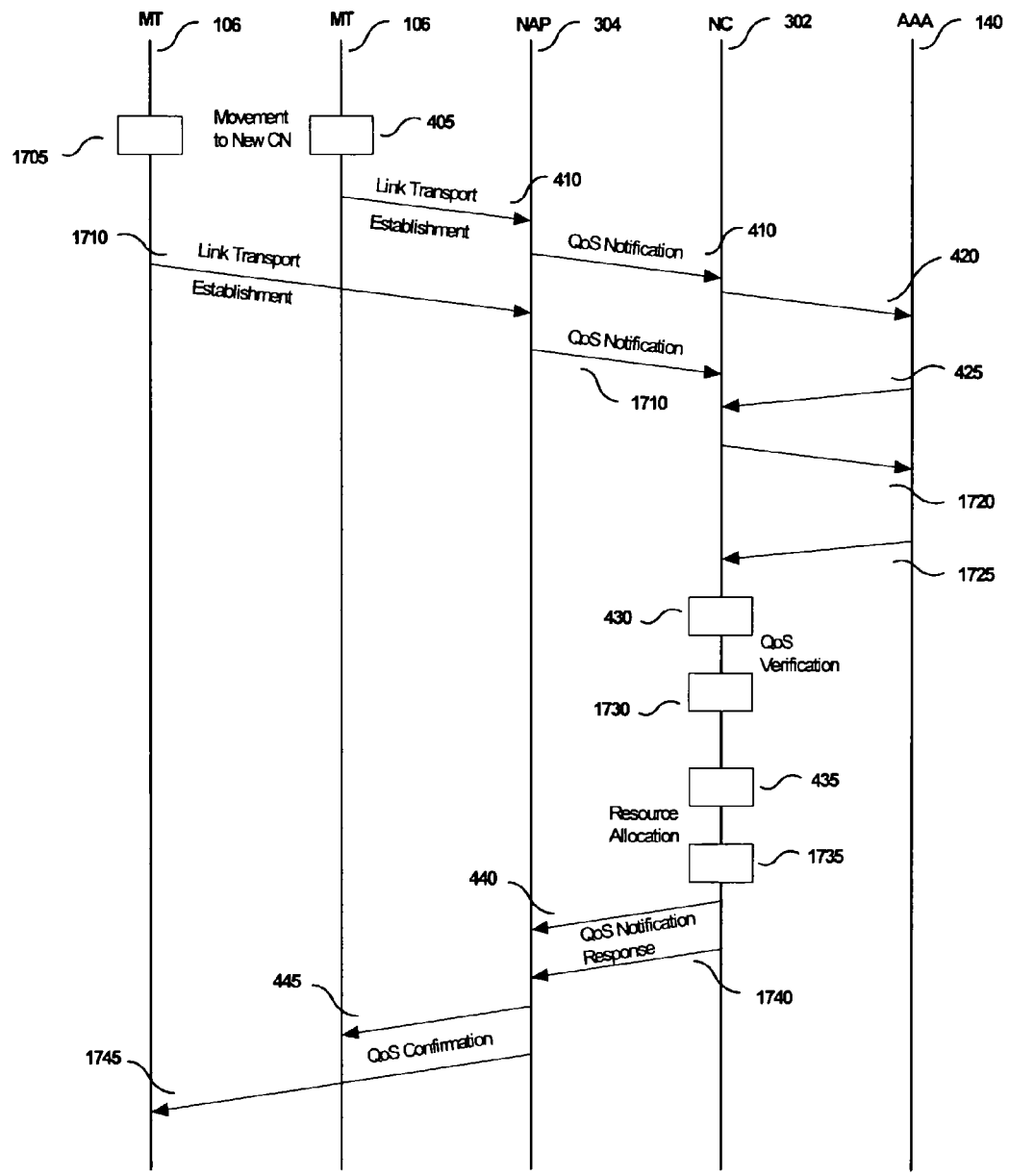
FIG. 17 illustrates a sequence of operations of the invention operating in a framework comprising mobile terminals from a plurality of communications networks.

The embodiment described hereinafter, with reference to FIG. 7, highlights efficient resource allocation for among a plurality of moving mobile terminals. There are three heterogeneous communications networks. In the current embodiment CN (100) is considered to be a cellular 3G communications network and CN (300) and CN (700) are considered to be IEEE 802.11 WLANs. Message sequence (1700) of FIG. 17 illustrates how the operation of invention may be easily extended for plurality of MTs from heterogeneous communications networks.

MT (106) and MT (306) move from their respective communications networks, cellular 3G CN (100) and IEEE 802.11 CN (300), to IEEE 802.11 CN (700) in corresponding steps (405) and (1705). NAP (704) and NC (702) must now determine most efficient QoS resource allocation for the two new mobile terminals.

According to prior arts, both MT (106) and MT (306) will send similar QoS resource requests as their requests are based only on the characteristics of the new network, namely high throughput and high packet loss-rates corresponding to IEEE 802.11 CN (700). However, in reality MT (106) and MT (306) will have distinct actual requirements due to their immediate service histories in distinct cellular 3G CN (100) and IEEE 802.11 CN (300), respectively. In particular, MT (106) will have actual requirements of relatively low throughput—corresponding to throughput of cellular 3G CN (100)—relatively low packet loss-rates and retransmission attempts. MT (306) will have actual requirements of relatively high throughput—corresponding to throughput of IEEE 802.11 CN (300)—relatively high packet loss-rates and retransmission attempts.

In accordance with the current invention, MT (106) and MT (306) send their respective QoS history information units to NC (702) during their link transport establishment with CN (700) in steps (410) and (1710), respectively. It is noted that while message sequence (1700) illustrates steps for MT (106) occurring prior to those of MT (306), the invention is identically applicable in alternative sequence of steps as the invention operates independently on the QoS history information units from each of the wireless mobile terminals. Since the QoS history information units are validated representations of actual resource utilizations in the previous communications networks, they provide NC (702) with the adequate information to make efficient resource allocation decisions.

Upon receiving the respective QoS history information units from MT (106) and MT (306) through NAP (304) in QoS Notification steps (415) and (1715), respectively, NC (702) verifies their authenticity using their AAA security association with AAA (140) and their time-stamps. This is achieved through respective exchanges of (420) and (425) and exchanges of (1720) and (17.25). This is followed by the QoS verification steps of (430) and (1730) for QoS history information units from MT (106) and MT (306), respectively. Next, NC (702) determines that MT (106) had relatively low throughput requirements, relatively low packet-loss rates and relatively few retransmission attempts in its previous cellular 3G CN (100). NC (702) also determines that MT (306) had relatively high throughput requirements, relatively high packet-loss rates and relatively high retransmission attempts in its previous IEEE 802.11 CN (300). NC (702) then determines that CN (700) need not initially provide identical resource allocations for MT (106) and MT (306) in order to meet their respective actual resource requirements.

Based on the determination of the mobile terminals' respective QoS histories, NC (702) allocates distinct levels of QoS and network resources to MT (106) and MT (306) in steps (435) and (1735), respectively. The resource levels are allocated based on QoS histories in the previous communications networks and prevailing network conditions at CN (700). Specifically, NC (702) initially allocates relatively lower throughput resources to MT (106) as compared to the resources allocated to MT (306). NC (702) also initially allocates higher integrity resources to MT (106) as compared to the resources allocated to MT (306). This is to compensate for higher packet loss-rates at CN (700) as compared to CN-(100). NC (702) makes such resource allocations so that both MT (106) and MT (306) initially receive communications services that are consistent with those received at their respective previous communications networks. Such an arrangement enables CN (700) to efficiently allocate QoS and network resources to meet actual requirements for mobile terminals. As a result, CN (700) according to the current invention can initially accommodate greater number of mobile terminals than those of prior arts. At later instances, CN (700) adjusts QoS and network resources for MT (106) and MT (306) based on prevailing network conditions at CN (700). Subsequently, NAP (704) is provided with resource allocation parameters and instructions for MT (106) and MT (306) through QoS Notification Response messages (440) and (1740), respectively. Then upon allocating corresponding QoS resources, NAP (704) confirms with each MT (106) and MT (306) the allocated QoS resources in steps (445) and (1745), respectively.

This embodiment illustrates how the current invention can achieve efficient QoS and network resource allocations for mobile terminals from heterogeneous communications networks. This allows the invention to be highly practical given the actual needs of communications users that receive communications services from a plurality of heterogeneous communications networks. The embodiment also highlights how the invention can be applied to increase instantaneous capacity of communications networks so as to accommodate a greater number of mobile terminals.

Embodiment 10

Flowchart

Figure 8:
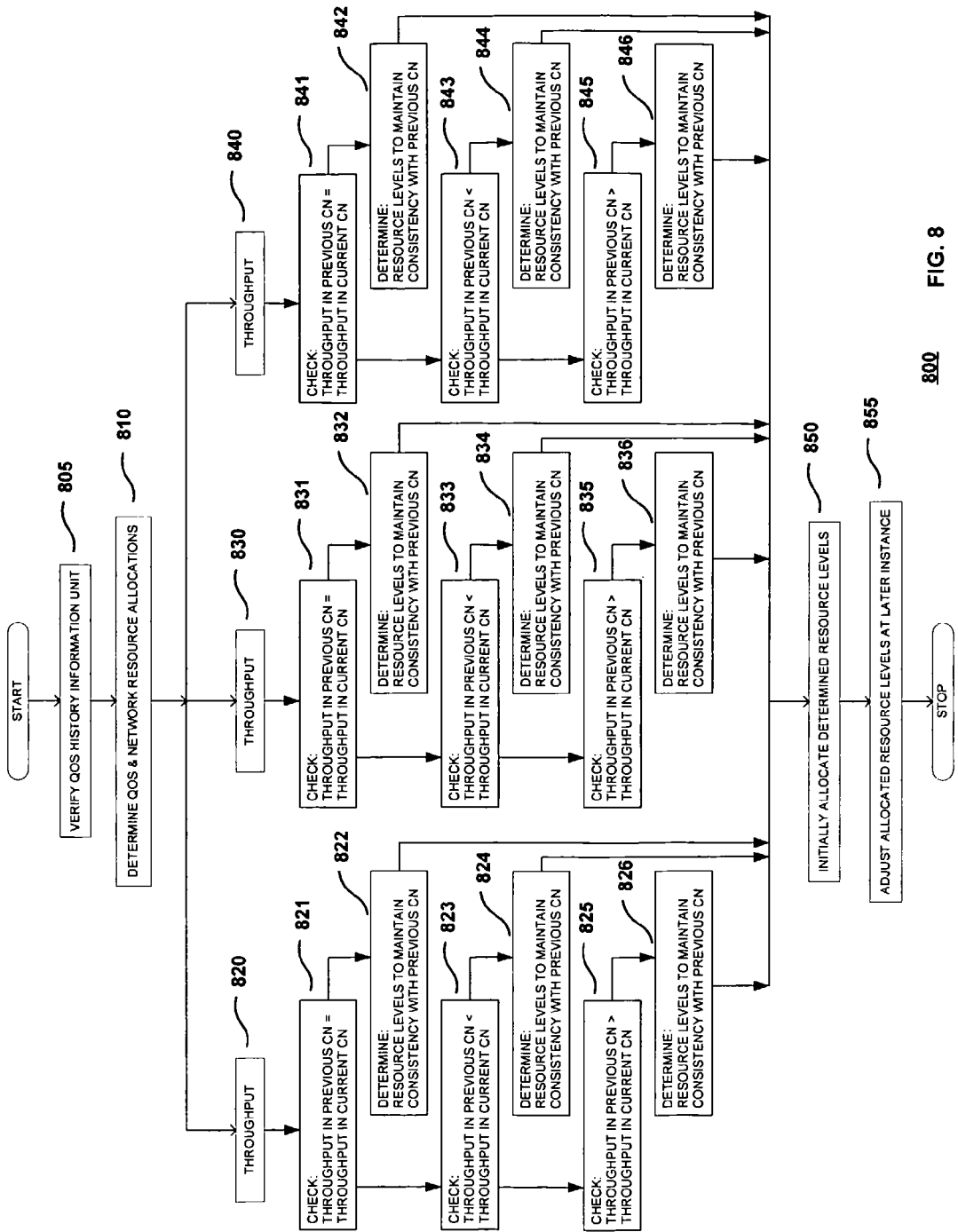
FIG. 8 depicts a flowchart of the sequence of operations for resource allocations in accordance with the present invention.

FIG. 8 illustrates a flowchart (800) of steps performed by a network controller (NC) in the allocation of QoS and Network Resources Based on the QoS History of mobile terminals. First, in a step (805) the NC of a current communications network (CN) verifies a QoS history information unit received from a mobile terminal (MT) entering the current CN from a previous CN. The step (805) comprises verifying the verification code of the information unit with an AAA server and of verifying the time-stamp of the information unit. In one embodiment, the verification step (805) comprises comparing the verification code received from the MT with that maintained by the AAA server. In an alternative embodiment, the verification step (805) comprises performing a hash function over the QoS history information unit received from the MT and the comparing the resulting fixed-length hash with the verification code received from the MT.

Next, in a step (810), NC of current CN determines the appropriate QoS and network resource allocations to be made to the entering MT from previous CN. The determination step (810) is based on the QoS history of the entering MT, the characteristics and prevailing conditions of the current CN. The determination step (810) comprises further steps for each of major network characteristics. Flowchart (800) illustrates three major network characteristics, namely network throughput (820), packet loss rates (830) and network delay (840). Additional network characteristics may be determined while being within the scope of the current invention.

[TPUT]

For network throughput (820), NC checks if the throughput achieved by the entering MT in its previous CN is equivalent to the throughput achievable in the current CN in a step (821). Differences in network throughput achievable among communications networks may comprise differences in technology, such as IEEE 802.11 and GPRS, and differences in the distance of an MT to its CN. If the comparison step (821) is positive, NC determines, in a step (822), initial resource levels such as to maintain consistency between throughput achievable at the current CN and throughput achieved by the entering MT in its previous CN.

If the comparison step (821) is negative, NC checks if the throughput achieved by the entering MT is lower than the throughput achievable in the current CN in a step (823). If the comparison step (823) is positive, NC determines, in a step (824), initial resource levels such as to maintain consistency between throughput achievable at the current CN and throughput achieved by the entering MT in its previous CN.

If the comparison step (823) is negative, NC checks if the throughput achieved by the entering MT is greater than the throughput achievable in the current CN in a step (825). If the comparison step (825) is positive, NC determines, in a step (826), initial resource levels such as to allow the entering MT to achieve as high throughput as the current CN can deliver. The determination step (826) may comprise assigning longer duration transmission opportunities in IEEE 802.11 WLANs or assigning greater number of packet data traffic channels in cellular GPRS communications networks.

[Packet Loss]

For packet loss-rates (830), NC checks if the packet loss-rates encountered by the entering MT in its previous CN is equivalent to the packet loss-rates that may be encountered in the current CN in a step (831). Differences in packet loss-rates encountered within communications networks may comprise differences in technology, such as IEEE 802.11 & GPRS, and differences in radio channel conditions such as interference. If the comparison step (831) is positive, NC determines, in a step (832), initial resource levels such as to maintain consistency between packet loss-rates that may be encountered at the current CN and packet loss-rates encountered by the entering MT in its previous CN.

If the comparison step (831) is negative, NC checks if the packet loss-rates encountered by the entering MT is lower than the packet loss-rates that may be encountered in the current CN in a step (833). If the comparison step (833) is positive, NC determines, in a step (834), initial resource levels such as allow the entering MT to encounter as low packet loss-rates as the current CN can deliver. The determination step (834) may comprise assigning higher priorities for transmissions or assigning greater error-control information to transmissions.

If the comparison step (833) is negative, NC checks if the packet loss-rates encountered by the entering MT is greater than the packet loss-rates that may be encountered in the current CN in a step (835). If the comparison step (835) is positive, NC determines, in a step (836), initial resource levels such as to maintain consistency between packet loss-rates that may be encountered at the current CN and packet loss-rates encountered by the entering MT in its previous CN.

[Network Delay]

For network delays (840), NC checks if the network delays encountered by the entering MT in its previous CN are equivalent to the network delays that may be encountered in the current CN in a step (841). Differences in network delays encountered within communications networks may comprise differences in load levels, such as home & office IEEE 802.11 WLANs, and differences in radio channel conditions such as interference. If the comparison step (841) is positive, NC determines, in a step (842), initial resource levels such as to maintain consistency between network delays that may be encountered at the current CN and network delays encountered by the entering MT in its previous CN.

If the comparison step (841) is negative, NC checks if the network delays encountered by the entering MT are lower than the network delays that may be encountered in the current CN in a step (843). If the comparison step (843) is positive, NC determines, in a step (844), initial resource levels such as allow the entering MT to encounter as low network delay as the current CN can deliver. The determination step (844) may comprise assigning higher priorities for transmissions or assigning longer transmission opportunities to transmissions.

If the comparison step (843) is negative, NC checks if the network delays encountered by the entering MT are greater than the network delays that may be encountered in the current CN in a step (845). If the comparison step (845) is positive, NC determines, in a step (846), initial resource levels such as to maintain consistency between network delays that may be encountered at the current CN and network delays encountered by the entering MT in its previous CN.

The resource level determination steps (822), (824), (826), (832), (834), (836), (842), (844) and (846) are followed by a resource allocation step (850). In this step, NC of the current CN allocates the initial QoS and network resources as determined in previous steps. In a step (855) at a later instance, resource allocations are adjusted to reflect prevailing network conditions of current CN.

This embodiment highlights the sequence of resource determination operations that help to bypass signaling overhead and allow for efficient resource allocations.

INDUSTRIAL APPLICABILITY

The aforementioned embodiments of the invention illustrate the applications of the invention for verifying and fast re-establishment of QoS and network resources. The embodiments show how the invention helps to verify resource requests, bypass signaling overhead, overcome the adverse effects of abrupt changes in network conditions and improve efficiency of resource allocations.

The invention claimed is:

1. A wireless communication system comprising a first communication network and a second communication network different from each other; and a mobile wireless user terminal that communicates with the networks; the system comprising:
the first communication network that evaluates a network resource used by the mobile wireless user terminal, and generates and transmits a QoS history information unit indicating the evaluation result to the mobile wireless user terminal,
the mobile wireless user terminal that requests for resource establishment to the second communication network when switching the communicating party from the first communication network to the second communication network and transmits the QoS history information unit to the mobile wireless user terminal; and
the second communication network that, when receiving the request for resource establishment from the mobile wireless user terminal, allocates the network resource to the mobile wireless user terminal based on the QoS history information.

2. The wireless communication system according to claim 1 further comprising:
an external entity that authenticates the QoS history information unit generated in the first communication network, wherein
the second communication network verifies the authenticity of the QoS history information unit to the external entity when receiving the request for resource establishment from the mobile wireless user terminal.

3. The wireless communication system according to claim 2, wherein external entity authenticates the QoS history information unit and provides a time-stamp; and
the second communication network first verifies the authenticity of the QoS history information unit by analyzing the time-stamp.

4. The wireless communication system according to claim 1, wherein the first communication network summarizes the communication network service received by the mobile wireless user terminal and generates the QoS history information unit.

5. The wireless communication system according to claim 1, wherein the second communication network allocates a network resource so as to be the consistent service level provided to the mobile wireless user terminal by the first communication network.

6. A method of establishing a resource when a mobile wireless user terminal switches the communicating party from a first communication network to a second communication network, the method comprising:
a first step in which the first communication network evaluates a resource utilization of the mobile wireless user terminal;
a second step in which the first communication network generates and transmits a QoS history information unit indicating the evaluation result to the mobile wireless user terminal;
a third step in which the mobile wireless user terminal requests for a resource establishment to the second communication network and transmits the QoS history information unit; and
a fourth step in which the second communication network allocates the network resource to the mobile wireless user terminal based on the QoS history information unit.

7. The method of establishing resource according to claim 6, wherein
in the second step, the external entity authenticates the QoS history information unit generated in the first communication network; and
in the fourth step, the second communication network verifies the authenticity of the QoS history information unit to the external entity when receiving the request for resource establishment from the mobile wireless user terminal.

8. The method of establishing resource according to claim 7, wherein
in the second step, the external entity authenticates the QoS history information unit and provides a time-stamp; and
in the fourth step, the second communication network first verifies the authenticity of the QoS history information unit by analyzing the time-stamp.

9. The method of establishing resource according to claim 6, wherein in the second step, the first communication network summarizes the communication service network received by the mobile wireless user terminal and generates the QoS history information unit.

10. The method of establishing resource according to claim 6, wherein in the fourth step, the second communication network allocates the network resource so as to be the consistent service level provided to the mobile wireless user terminal by the first communication network.

* * * * *